(12) United States Patent
Mangini et al.

(10) Patent No.: US 8,930,843 B2
(45) Date of Patent: *Jan. 6, 2015

(54) ELECTRONIC CONTENT WORKFLOW REVIEW PROCESS

(75) Inventors: Andrea L. Mangini, Santa Cruz, CA (US); Julie L. Baher, Mountain View, CA (US); Michael Townsend Wallen, Charleston, SC (US)

(73) Assignee: Adobe Systems Incorporated, San Jose, CA (US)

( * ) Notice: Subject to any disclaimer, the term of this patent is extended or adjusted under 35 U.S.C. 154(b) by 506 days.

This patent is subject to a terminal disclaimer.

(21) Appl. No.: 12/395,314

(22) Filed: Feb. 27, 2009

(65) Prior Publication Data

US 2013/0132886 A1     May 23, 2013

(51) Int. Cl.
*G06F 3/048*     (2013.01)
*G06Q 10/10*     (2012.01)

(52) U.S. Cl.
CPC ............... *G06Q 10/10* (2013.01); *G06F 3/048* (2013.01)
USPC ........................... 715/781; 715/732; 709/231

(58) Field of Classification Search
USPC ........... 715/781, 744, 751; 345/751; 707/104; 705/10; 717/120
See application file for complete search history.

(56) References Cited

U.S. PATENT DOCUMENTS

| | | |
|---|---|---|
| 5,040,142 A | 8/1991 | Mori et al. |
| 5,890,177 A | 3/1999 | Moody et al. |
| 5,892,900 A | 4/1999 | Ginter et al. |
| 5,995,940 A | 11/1999 | Ramaley |
| 6,088,709 A * | 7/2000 | Watanabe ..................... 715/233 |
| 6,243,722 B1 | 6/2001 | Day et al. |
| 6,687,878 B1 | 2/2004 | Eintracht et al. |
| 6,789,109 B2 | 9/2004 | Samra et al. |
| 6,898,601 B2 | 5/2005 | Amado et al. |
| 7,360,164 B2 | 4/2008 | Bjoernsen et al. |
| 7,366,979 B2 | 4/2008 | Spielberg et al. |
| 7,418,661 B2 | 8/2008 | Brandenberger |
| 7,555,557 B2 | 6/2009 | Bradley et al. |
| 7,559,017 B2 | 7/2009 | Datar et al. |
| 7,779,347 B2 | 8/2010 | Christiansen et al. |
| 7,783,154 B2 | 8/2010 | Wilkins et al. |
| 8,046,323 B2 | 10/2011 | Ma et al. |
| 8,055,712 B2 | 11/2011 | Kagawa et al. |
| 2002/0129057 A1 | 9/2002 | Spielberg et al. |
| 2003/0023755 A1 | 1/2003 | Harris et al. |
| 2003/0086695 A1 * | 5/2003 | Okamoto et al. ............... 386/94 |
| 2003/0112273 A1 | 6/2003 | Hadfield et al. |
| 2003/0182177 A1 * | 9/2003 | Gallagher et al. .............. 705/10 |
| 2004/0085354 A1 * | 5/2004 | Massand ...................... 345/751 |
| 2004/0172450 A1 | 9/2004 | Edelstein et al. |
| 2004/0230894 A1 | 11/2004 | Elza et al. |
| 2004/0237032 A1 | 11/2004 | Miele et al. |
| 2005/0120127 A1 * | 6/2005 | Bradley et al. ................ 709/231 |

(Continued)

OTHER PUBLICATIONS

Woohoo, "Photoshop Panels: Integrating your ExtendScripts", Dec. 22, 2008, 4 pages.

(Continued)

*Primary Examiner* — Matt Kim
*Assistant Examiner* — Tuan S Nguyen
(74) *Attorney, Agent, or Firm* — Wolfe-SBMC

(57) ABSTRACT

Subject matter disclosed herein relates to a process for reviewing electronic content.

26 Claims, 14 Drawing Sheets

(56) References Cited

U.S. PATENT DOCUMENTS

| | | | |
|---|---|---|---|
| 2005/0249374 A1 | 11/2005 | Levy | |
| 2006/0026502 A1 | 2/2006 | Dutta | |
| 2006/0069605 A1 | 3/2006 | Hatoun | |
| 2006/0161838 A1* | 7/2006 | Nydam et al. | 715/512 |
| 2006/0173803 A1 | 8/2006 | Morris | |
| 2007/0073776 A1* | 3/2007 | Kalalian et al. | 707/104.1 |
| 2007/0245243 A1* | 10/2007 | Lanza et al. | 715/723 |
| 2007/0260996 A1 | 11/2007 | Jakobson | |
| 2008/0028314 A1* | 1/2008 | Bono et al. | 715/732 |
| 2008/0077866 A1 | 3/2008 | Margulis | |
| 2008/0155615 A1 | 6/2008 | Craner et al. | |
| 2008/0177782 A1 | 7/2008 | Poston et al. | |
| 2008/0235597 A1* | 9/2008 | Schlesinger et al. | 715/744 |
| 2009/0055483 A1* | 2/2009 | Madan et al. | 709/206 |
| 2009/0076843 A1 | 3/2009 | Graff et al. | |
| 2009/0083710 A1* | 3/2009 | Best et al. | 717/120 |
| 2009/0097815 A1 | 4/2009 | Lahr et al. | |
| 2009/0164985 A1 | 6/2009 | Balko et al. | |
| 2009/0249224 A1 | 10/2009 | Davis et al. | |
| 2009/0319885 A1 | 12/2009 | Amento et al. | |
| 2010/0131836 A1 | 5/2010 | Dukhon et al. | |
| 2010/0138756 A1 | 6/2010 | Saund et al. | |
| 2010/0293027 A1 | 11/2010 | Du Fosse | |
| 2012/0144286 A1 | 6/2012 | Bank et al. | |
| 2013/0132455 A1 | 5/2013 | Mangini | |
| 2013/0132814 A1 | 5/2013 | Mangini | |

OTHER PUBLICATIONS

Patent Application in related matter U.S. Appl. No. 12/395,197, filed Feb. 27, 2009, 56 pages.

Patent Application in related matter U.S. Appl. No. 12/395,390, filed Feb. 27, 2009, 63 pages.

http://en.wikipedia.org/wiki/Image_map, Image map, last modified on May 22, 2009, printed on May 27, 2009, 2 pages.

U.S. Appl. No. 12/361,343, filed Jan. 28, 2009, Adobe Systems Incorporated, all pages.

Ron White, "How Computers Work," Oct. 2003, Que, 7th Edition, 136 pages.

U.S. Appl. No. 12/472,916, filed May 27, 2009, Adobe Systems Incorporated, all pages.

U.S. Appl. No. 12/130,895, filed May 30, 2008, Adobe Systems Incorporated, all pages.

"Track Changes & Comments in Microsoft Word", University of North Carolina Writing Center course handout, www.unc.edu/depts/wcweb 1998-2007, 4 pages.

"How to Use Microsoft Word's Commenting Features," http://www.cwrf.utexas.edu/node/56, 1998, 6 pages.

"Commenting and Markup tools Overview," http://help.adobe.com/en_US/Reader/8.0/help.html?content=WSA13C481B-B0A-41d5-ADDF-3C669541CA35.html, Jul. 2006, 2 pages.

Adobe Reader 8 User's Manual, Copyright © 2006 Adobe Systems Incorporated, 142 pages.

"Quick Tip: Resize any Textbox or textarea," How-to-geek, Jun. 25, 2007, pp. 1-2.

Dummies.com, "Adding and Hiding Comments in Word 2007," downloaded via the Waybackmachine, Dec. 8, 2007-May 15, 2008, 2 pages.

Steve Johnson, "Microsoft Office Word 2007 on Demand," Feb. 13, 2007, Que, 4 pages.

"Final Office Action", U.S. Appl. No. 12/395,197, (May 14, 2013), 10 pages.

"Non-Final Office Action", U.S. Appl. No. 12/395,197, (Oct. 5, 2012), 11 pages.

"Non-Final Office Action", U.S. Appl. No. 12/395,197, (Oct. 27, 2011), 11 pages.

"U.S. Application as Filed", U.S. Appl. No. 12/395,197, (Feb. 27, 2009), 56 pages.

"U.S. Application as Filed", U.S. Appl. No. 12/395,314, (Feb. 27, 2009), 53 pages.

"Final Office Action", U.S. Appl. No. 12/395,390, Nov. 25, 2011, 8 pages.

"Non-Final Office Action", U.S. Appl. No. 12/395,197, Dec. 24, 2013, 10 pages.

"Non-Final Office Action", U.S. Appl. No. 12/395,390, Oct. 7, 2013, 8 pages.

"Non-Final Office Action", U.S. Appl. No. 12/395,390, Jun. 9, 2011, 8 pages.

"Final Office Action", U.S. Appl. No. 12/395,197, Aug. 4, 2014, 17 pages.

* cited by examiner

US 8,930,843 B2

ELECTRONIC CONTENT WORKFLOW REVIEW PROCESS

RELATED APPLICATIONS

The present application is related to the following US patent application: U.S. patent application Ser. No. 12/395,390, titled "Electronic Content Editing Platform Environment", by Mangini, et al., filed Feb. 27th, 2009 and assigned to the assignee of the presently claimed subject matter; and U.S. patent application Ser. No. 12/395,197, titled "Electronic Content Editing Process", by Mangini et al., filed Feb. 27, 2009 and assigned to the assignee of the presently claimed subject matter.

BACKGROUND

1. Field

Subject matter disclosed herein relates to a process for reviewing electronic content.

2. Information

A workflow for developing, reviewing, or editing electronic content may involve many details or aspects. Such aspects, for example, typically may include one or more reviewers or editors reviewing at least portions of electroniv content in the form of images, video, or other visual information, as examples. Of course, it is understood that such content, here, may include an audio portion as well. Increasingly, reviewers or editors for particular electronic content are located remotely from one another. In such a situation, it may be advantageous to electronically transport content among reviewers or editors, such as by processes involving electronic mail or the Internet. Upon or after completion of a reviewer or editor's task, electronic content may be retrieved and sent to another reviewer or editor. For example, an editor may send content to a first reviewer, wait for notification that the first review has complete a task, then send the content to a second reviewer, and so on. Since several members may be involved in processing, reviewing, or editing such content, a workflow to review content may be relatively long or relatively complex. Managing or working with such a workflow may thus be complex and such complexity may make it error-prone. Accordingly, there is a need to streamline or simplify a review process.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
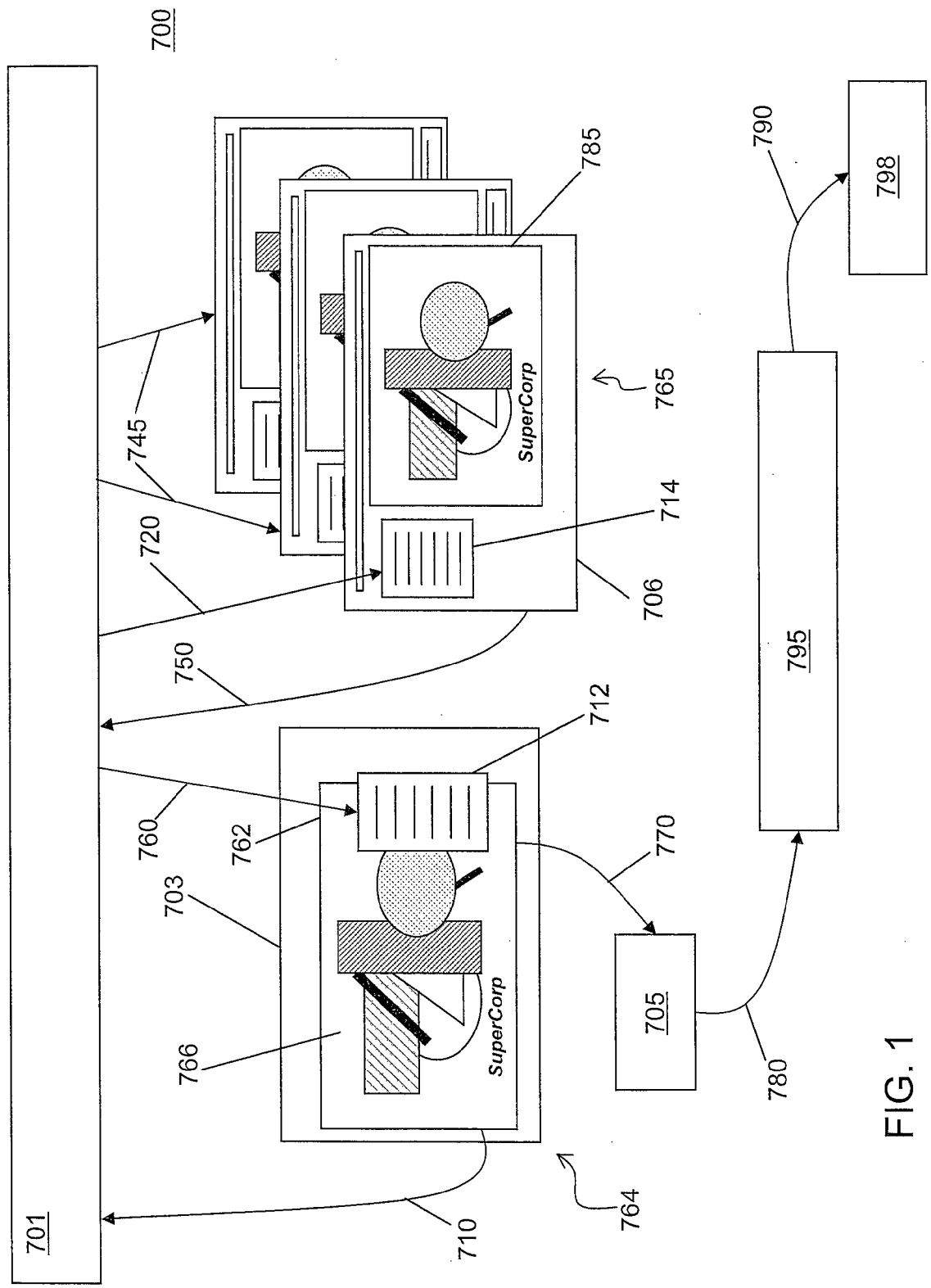
FIG. 1 is a schematic diagram illustrating a workflow review process, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

In one or more embodiments, a graphical user interface (GUI) may refer to a program interface that utilizes displayed graphical information to allow a user to control or operate a special purpose computing platform, for example. A pointer may refer to a cursor or other symbol that appears on a display that may be moved or controlled with a pointing device to select objects or input commands via a GUI of a special purpose computing platform, for example. A pointing device may refer to a device used to control a cursor, to select objects, or to input information such as commands for example via a GUI of a special purpose computing platform, for example. Such pointing devices may include, for example, a mouse, a trackball, a track pad, a track stick, a keyboard, a stylus, a digitizing tablet, or similar types of devices. A cursor may refer to a symbol or a pointer where an input selection or actuation may be made with respect to a region in a GUI. Herein, terms such a "click" or "clicking" may refer to a selection process made by any pointing device, such as a mouse for example, but use of such terms is not intended to be so limited. For example, a selection process may be made via a touch screen. However, these are merely examples of methods of selecting objects or inputting information and claimed subject matter is not limited in scope in these respects.

In an embodiment, a workflow review process to review electronic content may allow one or more editors or reviewers to seamlessly or efficiently review or comment on content, such as visual or audio content, for example, or to exchange reviewed electronic content among one another. For the remainder of this specification, it shall be understood that any references to content, visual content or audio content is intended to mean electronic content and is not intended to be limited only to visual content only to audio content or only to a combination of only audio and visual content. Rather, these are merely provided as typical examples. In one implementation, therefore, content may comprise images, video, or other visual information, including text or motion of an interactive user environment, for example. Such a workflow review process, for example, may provide benefits such as allowing reviews or comments to be consumed or redered in a variety of contexts, including, but not limited to, on a network, such as a web or the Internet, where reviews or comments may be seen relatively close in time to the context of a presentation, if desired (a "review"); as a summary, where comments may be shown outside the context of a review, but may be accompanied by reference images or videos associated with the comments; or presented within a desktop authoring application GUI, via a review panel for example, where comments may be sorted, filtered, checked off as complete, or viewed in the context of a document or documents of origination, such as Adobe Systems' InDesign® desktop publishing applications, available from Adobe Systems, Inc. of San Jose, Calif. Details of such examples will be explained below. Of course, such a description of a workflow process and its benefits is merely an example, and claimed subject matter is not so limited.

Such a workflow review process may be facilitated, at least in part, by a special purpose multimedia computer platform, such as Adobe Systems' Creative Suite® collection of graphic design, video editing, or web development applications. Such a process may also be facilitated, at least in part, by an additional special purpose multimedia computer platform, such as Adobe Systems' Flash® multimedia platform, which may provide a platform for editors or reviewers to conveniently exchange such content via a network such as a local area network (LAN), a wide area network (WAN), or the Internet, for example. Herein, "editor" may refer to a person who designs, creates, edits, or reviews visual content. "Reviewer" may refer to a person who reviews such visual content, for example. Additionally, "user" may refer to an editor or a reviewer, for example. Of course, claimed subject matter is not limited to such definitions, and roles or activities among editors or reviewers may switch or blend, for example. In a particular embodiment, reviewers or editors may be electronically messaged regarding availability of visual content for review. Such electronic messaging may help to avoid or reduce lag times that may ordinarily exist in a review process involving multiple participants. An embodiment of a workflow review process may also include electronically supplying visual content to reviewers or editors for completion of tasks in accordance with a workflow schedule or time limitations, which will be described in further detail below. Such a workflow process may allow convenient collaboration among reviewers or editors by providing visual content for review or electronic communication among reviewers and editors without any particular action by reviewers or editors beyond reviewing, commenting, or editing, for example.

In an embodiment, at least some tasks may comprise commenting upon visual content, such comments being captured in electronic form. In this particular context, the term comment is intended to refer to a message that is provided with respect to electronic content, although it may take any one of a variety of forms. For example, it may comprise text, visual or audio content or any other electronic communication intended to convey a message. Typically, although not necessarily, the message may also be intended to explain, illustrate, question, expand upon, critique, or otherwise edit the particular visual content that is associated with the message. A reviewer or editor may make a comment about a particular portion of visual content, for example. In a conventional review process, a reviewer may explain or describe a particular portion of visual content he or she is commenting on, so that one reading the comment may realize what the comment is about. For example, such a comment may be like, "Regarding the yellow banner in the upper-right portion of the photo, I think it should be green". In this example, a large portion of the comment is employed to establish the context of the substantive portion of the comment.

However, in a particular embodiment, in accordance with particular subject matter, a comment may be electronically associated with a snapshot or video clip representing a particular portion of visual content selected by the reviewer making the comment. Accordingly, one who is later reading the comment may also view an accompanying snapshot or video clip to which the comment pertains. Here, for example, this both saves the person making the comment time and makes the context more clear to the person reviewing the comment. Likewise, if there are edits to the content, those also will typically be more clear because the context of the edits or comments has been provided.

In one particular implementation, a reviewer making a comment regarding a particular portion of visual content, such as a photograph, may use a computer mouse, or other pointing or selecting device, to click or otherwise select the particular portion of the photograph. In another implementation, a reviewer may make different types of comments by simple gestures of a mouse or other pointing or selecting device. Accordingly, a reviewer need not select a different tool to make different types of comments. For example, a reviewer may click on visual content to create a comment regarding a specific position, which may be represented by coordinates, of a graphic. In another example, a reviewer may, in one embodiment, click and drag a mouse or other pointing or selecting device to comment on a region of interest in the graphic, or select text to create a text comment. Subsequently, the reviewer may be prompted to type his or her comment, for example. In such a commenting or editing process, therefore, a reviewer need not explain or describe within the comment what particular portion of visual content he or she is commenting upon or editing. Instead, the reviewer may merely click on the portion of visual content to select such a portion of visual content, such as a snapshot or video clip, whether edited or unedited, which may subsequently accompany, or be associated with, the comment to provide context to the comment. Further, in a particular implementation, portions or elements of selected portions of visual content associated with comments may be selectively omitted upon being displayed in a review panel in order to avoid a cluttered or confusing display. Such a comment and associated snapshot or video clip may then be electronically communicated among other subsequent reviewers or editors participating in a workflow review process, without any particular additional action by the users. Accordingly, such an embodiment of a workflow review process may provide participants with an efficient, convenient, or simple-to-use visual experience for reviewing visual content or collaborating among multiple reviewers. In addition, as suggested, associating a comment with a particular portion of visual content may provide a reviewer or editor a convenient way to determine in what context such a comment or edit may have been made with respect to the visual content.

In an embodiment, an editor or reviewer may carry out tasks, such as edits or reviews of visual content, on a variety of special purpose client computers or computing platforms able to communicate with a special purpose host or server computer or device. Such a server-client configuration, and benefits that such a configuration may provide, will be explained in further detail below. There may be no single type of special purpose client computer or computing device with which an editor or reviewer chooses to edit or review. Furthermore, at least in part because the device hardware may vary, likewise, frequently, the particular applications being executed by the device hardware may vary. This is at least in part a reflection of special purpose or specific purpose nature of the hardware and software that may be employed. In fact, such review participants may work with various types of special purpose devices, examples of which may include a thin client computing device (e.g., network appliance), a desktop computing device, a mobile phone, or a personal digital assistant (PDA), just to name a few examples. Such devices, as just indicated, likewise, have a variety of varying resident or add-on applications. Despite such a possible diversity of hardware and software, a review process that maintains a user environment that is reasonablye consistent across multiple users is a desirable goal.

A special purpose client device, which may herein be called simply a client device, may comprise a display and a GUI to display visual content for review or editing. Of course, the device and the display are typically specific hardware, whereas a GUI is typically an application designed to be executed by the specific hardware. A client device may also comprise a network browser or a similar application that enables the client device to interact with display information located on a network, such as the Internet.

Of course, various embodiments of a client device and associated GUI are possible and it is not intended to limit claimed subject matter to a particular embodiment. Nonetheless, a variety of possible embodiments are described below without intending to be limiting in any way. Such a client device may, for example, in one embodiment comprise a special purpose machine capable of executing instructions represented by digital signals. A GUI may include a user interface to display an image or play a video segment, where the video segment may further include multiple selectable video clips, for example. A GUI may also include a user interface comprising a review panel to present one or more representations of multiple selectable review processes along with reviewer comments and portions of visual content respectively associated with the review processes. Such portions of visual content may comprise thumbnail representations of multiple selected portions of visual content to which an associated comment refers, for example, including edits content in many cases. Of course, such descriptions of a GUI are merely examples, and claimed subject matter is not so limited.

In a particular embodiment, and as mentioned above, a GUI may include a review panel for managing one or more review processes. For example, a review panel may display elements that are user-selectable for a variety of review-management operations, which will be described in further detail below. Such elements, which may be displayed in a listing or arrangement of one or more review processes, may include a thumbnail of visual content, status of a review process, or various review parameters respectively associated with the one or more review processes, such as the number of participating reviewers or the number of reviewer comments posted, for example. A GUI may also include a special purpose computer application or other software to manage or manipulate visual content, such as Adobe Systems' Photoshop® graphics editing program or a word processing program. In one implementation, an API provided by a special purpose host or server computer may be used to support the building of a GUI or review panel on a special purpose client device, such as a thin client device merely running a web browser, for example. Such an implementation may provide an advantage including an ability of reviewers or editors to work with a reasonably standardized review panel despite a possibility of working on special purpose client devices having a variety of operating systems, platforms, or applications (e.g., various hardware or software capabilities), as mentioned above. For example, such a standardized review panel may be displayed with a GUI of a variety of platforms or applications with which a reviewer or editor may prefer to work. In one particular embodiment, a review panel may be displayed in a foreground while contents or elements of an application run in a background. Accordingly, such an arrangement of a GUI may allow a user to manage a review process or work with one or more applications to edit or manipulate visual content, for example, using an application-specific properties panel, which may include image controls, motion controls, opacity property controls, volume controls, or the like. Of course, claimed subject matter is not limited in scope to employing this particular product or to the approach employed by this particular product. Rather this is merely provided as one example of an embodiment including this capability; however, many other approaches to providing this capability are available and claimed subject matter is not limited in scope to any particular approach.

An ability of a reviewer or editor to work on a thin client may be an advantage provided by a client/server system, which may be included in one embodiment of a review process. Software residing on the thin client may merely include a user interface, certain frequently-used applications, or a networked operating system, for example. By maintaining a relatively small software load, a thin client may comprise a relatively small or low-powered device, while a server, or a cluster of servers, may comprise the full load of multiple applications, services, and stored information, for example. By shifting such computing burdens to a server, for example, while keeping multiple thin clients lightly loaded, users may expect easier system management, lower costs, as well as advantages of networked computing that include central storage/backup or easier to use security.

A workflow review process, according to an embodiment, may operate based at least in part on a client-server network, wherein one or more servers may operate as a hub to implement a workflow review process, serving one or more client devices, including, for example, a network appliance or a PDA. Editors or reviewers working on such client devices may be provided advantages such as improved communications or collaboration among one another. For example, comments made by multiple reviewers may be communicated among the multiple reviewers via a workflow management server that may provide a consistent or more efficient user-experience (e.g., GUI) regardless of a type or ability of client device on which reviewers are working. Such a client-server network may use extensible markup language (XML), or other content management language, to share information among one or more editors or reviewers, for example. In one embodiment, a specific or special purpose computing platform, such as a client device for example, may include a web browser or other application to communicate with a network, such as the Internet. In other words, exchanging or sharing applications, files, or electronic signals associated with a workflow review process may be facilitated by XML or other content management language, as explained below.

Therefore, such applications, files, or electronic signals may be located separately or together on any portion of an electronic network or specific computing platform. In a particular embodiment, a management service, which may comprise a specific apparatus executing software that performs management service operations, for example, may be used to share or organize comments. Although claimed subject matter is not limited in scope in this respect, it is noted that LiveCycle® Data Services software, for example, is available from Adobe Corp. However, claimed subject matter is not limited in scope to employing this particular product or to the approach employed by such a product. For example, alternatively, XML or other content management language may also be used to share comments, such as importing comments as XML-formatted notes into a review panel. However, again, claimed subject matter is not so limited in scope.

As will be explained in further detail below, a format in which to share comments, snapshots, video clips, or notes may be employed based, at least in part, on systems or equipment used by particular reviewers or the editor. For example, some reviewers may use tools that integrate relatively seamlessly that comply with XML or that are compatible with XML-formatted comments, while other reviewers may use tools that integrate relatively seamlessly that comply with or that are compatible with a management service, as described above. Of course, such a description of formatting is merely an example, and claimed subject matter is not so limited.

As was indicated, a visual content review process may proceed independently of where such applications, files, electronic signals, or other information may be located in an overall system or network. For example, in a particular embodiment, a workflow management server may transmit visual content review signals to or from a special purpose client device for an editor or reviewer. In such a case, one may log onto a client-server system to begin participation in a workflow review process. In another particular embodiment, such as a desktop-based process, a special purpose or specific computing platform used by editors or reviewers, for example, may include a browser application to transmit signals to or receive signals from a server that operates to oversee or manage a workflow review process. In still another particular embodiment, a reviewer or editor need not be logged onto a client-server system to participate in a review process. Such participation may occur offline, wherein a workflow management server may transmit an email or other electronic communication including visual content and associated information of a workflow review process to a reviewer or editor. Though offline participation may not be real-time or interactive among other reviewers, such participation may be most convenient for a particular reviewer or editor, for example. Of course, such details regarding a workflow review process are merely examples, and claimed subject matter is not so limited.

FIG. 1 is a schematic diagram illustrating a summary of a workflow review process 700, according to an embodiment. An editor working on a special purpose client device 764, for example, may view, create, or edit visual content 766 via an editor display 703. Such a display may include a window or canvas 762 to provide or present visual content 766 and a review panel 712 to manage a review process. To begin workflow review process 700, an editor may, using review panel 712, for example, upload visual content or related information, as indicated by flow arrow 710, to a process management engine 701. Such a process management engine may reside on a workflow management server, for example, and may comprise a special purpose computing apparatus capable of executing instructions represented by digital signals, for example. Herein, the terms "process management engine" and "workflow management server" may be used interchangeably. In one implementation, process management engine 701 may provide an API to support the building of a GUI, such as review panel 712, on special purpose client device 764, as mentioned above. Process management engine 701 may provide process or workflow management including signal capture, digital rights management, content services, or content management, just to name a few examples, which will be explained in further detail below. One potential example of a process or a system having the capability to provide such process or workflow management may, for example, comprise a specific or special purpose apparatus executing the LiveCycle® software for editing visual content, available from Adobe Systems, Inc. of San Jose, Calif., mentioned above. Of course, claimed subject matter is not limited in scope to employing this particular product. Rather this is merely provided as one example of accomplishing this capability; however, many other approaches to providing this capability are available and claimed subject matter is not limited in scope to any particular approach.

Process management engine 701 may provide review information to one or more reviewers working on one or more special purpose client devices 765, indicated by flow arrow 720. Such information may include visual content 785 or reviewer comments placed in a comment panel 714, for example, in a reviewer display 706. In one implementation, process management engine 701 may provide an API to support the building of a GUI, such as comment panel 714, in reviewer display 706. Upon or after selecting particular visual content to review, a reviewer may electronically post comments to process management engine 701, as indicated by flow arrow 750. Such comments may be associated with selected portions of visual content, coordinates, a timecode, text flow, or other information representing portions of visual content. Such coordinates, for example, may comprise those of a display or a canvas on which visual content is displayed. A timecode may comprise a Society of Motion Picture and Television Engineers (SMPTE) timecode. Such a timecode may be used to identify selected portions of visual content, for example. Text flow may comprise text patterns, for example, that may be used to identify selected portions of visual content comprising text. Of course, these are just examples, and claimed subject matter is not so limited. A reviewer may also interact with other reviewers, via process management engine 701, perhaps in real time, as depicted by flow arrows 745. As depicted by flow arrow 760, process management engine 701 may electronically provide reviewed visual content or associated comments to an editor, who may receive electronic notification that particular visual content has been reviewed or that associated review comments are available. In another implementation, an editor may electronically export comments, including available electronic comments from all reviewers and the editor, into a file 705 or storage medium, indicated by flow arrow 770, for example. Such a file may be electronically imported into visual content editor 795, indicated by flow arrow 780, which may comprise a visual content editing system such as Adobe Systems' Photoshop® graphics software or Premier Pro® system, for example. In still another implementation, process management engine 701 may communicate directly with visual content editor 795 so that reviewed visual content or associated comments need not be exported or imported to or from process management engine 701 in a separate process. Using such a visual content editor, an editor may edit visual content, as indicated by flow arrow 790, to render "finished" visual content 798. Of course, such a process management engine is merely an example, and claimed subject matter is not so limited.

Figure 2:
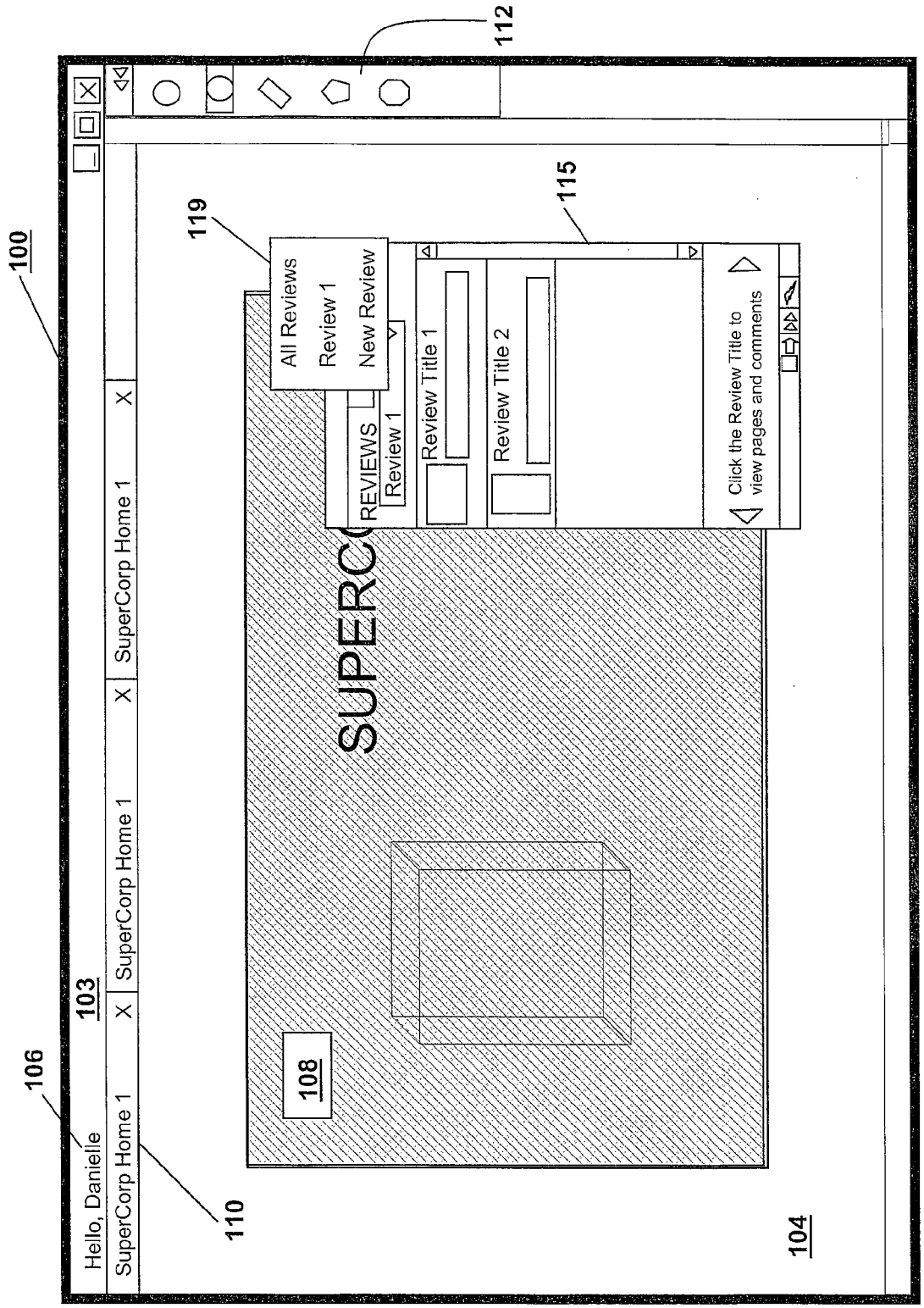
FIG. 2 is a representation of a screenshot view of a user display, according to an embodiment.

FIG. 2 is a representation of a screenshot view of a display 100, such as here an editor display, according to an embodiment. Such a display and its associated GUI may be operated by a special purpose client device, such as client device 764 shown in FIG. 1 for example, including a thin client or other computing device, which may communicate with other displays via an electronic network, such as a LAN, a WAN, or the Internet, for example. Display 100 may comprise a window toolbar 103 that includes indicator 106 to display log-in status regarding a signal or communication connection to a workflow management server or host, which will be explained in greater detail below. Display 100 may also comprise application window 104 as a GUI for a computing application or platform to manage or manipulate visual content. Such a window may include a canvas area for displaying visual content 108, tabs 110 for selecting among multiple pages of a project, toolbar 112 for controlling, editing, or manipulating visual content 108, and a review panel 115 for managing editing or reviewing processes. Review panel 115 may be displayed in a foreground of visual content 108 or other portion of application window 104. Tabs 110 may be used to select among multiple renditions of a project, wherein a rendition may comprise a document of an application, such as an Adobe Systems' Photoshop graphics document, for example. At the beginning of a review process, visual content 108, which may comprise a Joint Photographic Experts Group (JPEG) or other type of formatted file for example, may be selected by an editor from data storage devices, a network, or created by an application editor within an environment hosted by a computing application or platform, as mentioned above. Of course, a Photoshop graphics document and a JPEG file are merely examples, and claimed subject matter is not so limited.

Upon of after completion of selecting or creating visual content 108, an editor, using review panel 115, may upload a page or document including visual content 108, or a portion thereof, into a portion of a memory device on a workflow management server on a network, for example. In a particular embodiment, such a memory device may reside on a workflow management server on a network. In the course of working with review panel 115, sub-panels, such as sub-panel 119, may appear to provide an editor with management options, for example. In the example illustrated in FIG. 2, sub-panel 119 may provide an opportunity to select among a number of review processes or to create a new review process. Of course, such details of a display or a review panel are merely examples, and claimed subject matter is not so limited.

Figure 3:
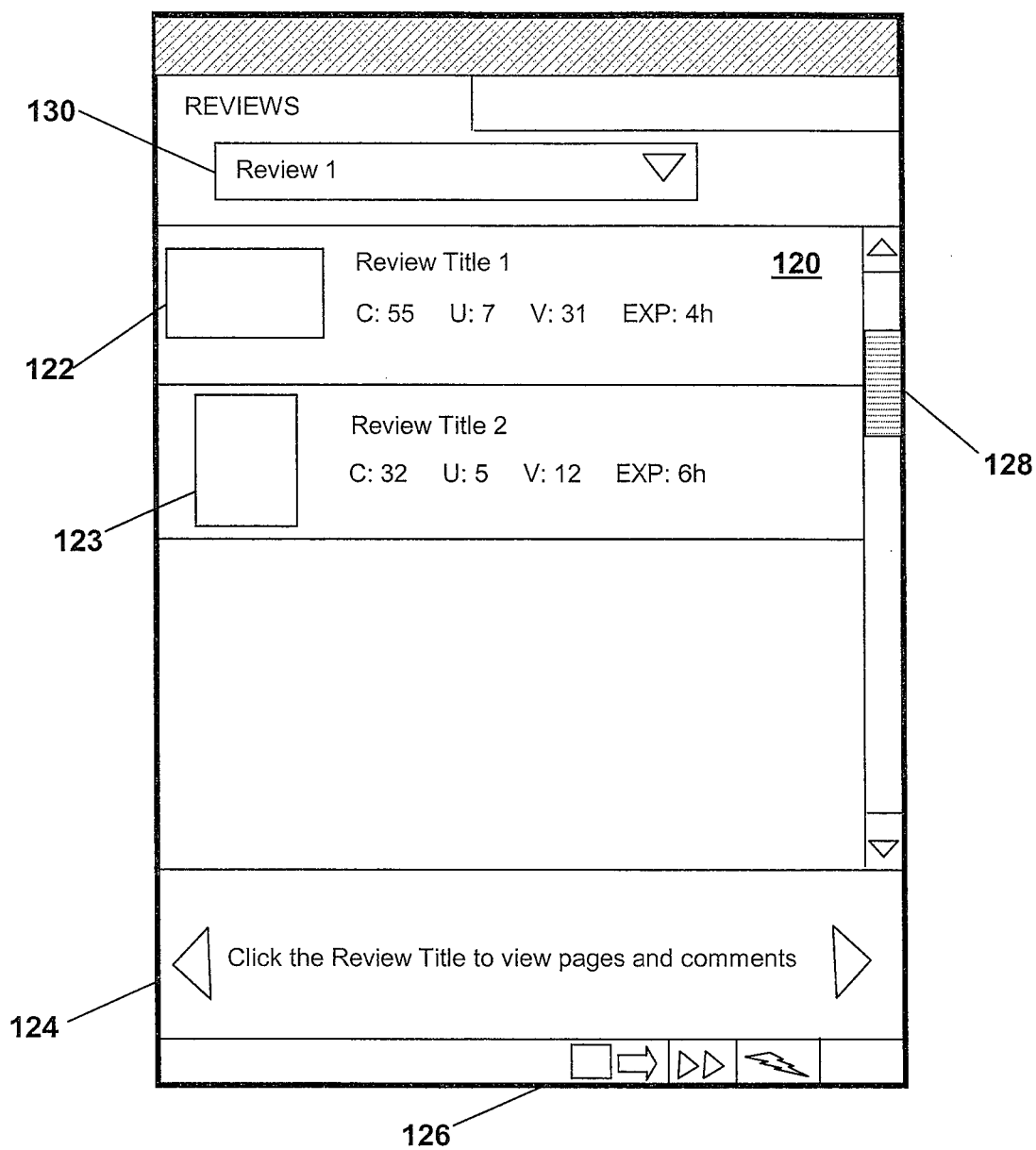
FIG. 3 is a representation of a review panel, according to an embodiment.

FIG. 3 is a representation of an example view of a review panel, such as review panel 115 shown in FIG. 2 for example, according to an embodiment. A review panel may comprise dynamic or user-selectable content for managing one or more review processes. For example, review panel 115 may display elements that are user-selectable for a variety of review-management operations, which may be displayed in a listing or arrangement of one or more review processes 120. In a particular embodiment, review panel 115 may be generated using, at least in part, a special purpose multimedia computer platform, such as Adobe Systems' Flash® multimedia platform, as mentioned above, for example. A special purpose client device hosting a GUI used to display review panel 115 may communicate with a workflow management server on a network, for example, to download information regarding one or more review processes that are stored with reference to a user-ID associated with the client device. In this fashion, review panel 115 may be populated with dynamic or user-selectable content or updated continually or from time to time. In this context, dynamic refers to the notion that such content may change, because of an update for example, without action by a user. Of course, such a relation between a special purpose client device and a special purpose network server is merely an example, and claimed subject matter is not so limited.

In an embodiment, a host application or other software may execute on such a client device to provide a window comprising review panel 115. Concurrently, a special purpose multimedia platform, such as Adobe Systems' Flash® platform may be used in conjunction with Adobe Systems' CSXS routine library, for example, to provide content for review panel 115. For example, a special purpose network server may host such a CSXS library. In one implementation, one or more operations or routines included in a CSXS library may make a call to a host application, such as Adobe Systems' Photoshop® graphics editing program, located on a special purpose client device, in order to display a review panel 115, which may be displayed in the foreground of other display content. In another implementation, a special purpose network server may transmit instructions to a special purpose client device, such as a thin client for example, to display a review panel. Subsequently, a special purpose network server may transmit information to a special purpose client device to provide such a review panel with information to populate information fields during, for example, a review process. Such information may include reviewer comments, associated snapshots or video clips, or status of one or more review processes, just to name a few examples. Such information, as described above, may comprise dynamic or user-selectable content for managing one or more review processes, wherein such dynamic or user-selectable content may be updated continually or from time to time. In one embodiment, the underlying content on top of which a review panel is displayed in a foreground remains unaffected despite the presence of the review panel. Thus, a review panel may act as a display layer that is independent of other display layers, though claimed subject matter is not so limited Returning to FIG. 3, review panel 115 may comprise a list or other arrangement of review processes 120, a scroll bar 128 to scroll among multiple review processes, an instruction field 124 that may be selectively populated with instructions to operate the review panel, a toolbar 126, or a pull-down menu 130 for selecting among the list of review processes for example. In one implementation, such instructions may change from time to time, such as to reflect what review panel 115 is displaying at a particular time. For example, such instructions may include a short explanation of how to create a new review process, how to rearrange a sequence of pages in a review, or other instructions that may be relatively short enough to fit in instruction field 124. In a particular implementation, the list or arrangement of review processes 120 may be organized or rearranged by a user using a mouse, or other pointing or selecting device, to click and drag, for example, individual review process listings above or below one another. In another particular implementation, a user may use a workflow management server to organize or rearrange the list or arrangement of review processes 120 chronologically, alphabetically, by reviewer, by deadline, or by importance, just to name a few examples. In still another particular implementation, a user may use a workflow management server to filter the list or arrangement of review processes 120 to show one or more subsets of the review processes. Such filtering, which may be selected by a user, may arrange review processes into subsets based at least in part on a variety of parameters, including reviewer, importance, or date of reviews, just to name a few examples.

In a particular embodiment, pull-down menu 130 may include a selection to create a new review, which, upon or after selection, may create a new review structure at a workflow management server on a network. Such a review structure at a workflow management server may accommodate a review process to be managed via review panel 115, for example. The list or arrangement of review processes 120 may include a thumbnail image 122, which may comprise a snapshot or video clip of visual content associated with the list or arrangement of review processes 120, for example. The list or arrangement of review processes 120 may also include status information regarding the review process. Such status information may be useful for an editor, reviewer, or someone else to manage review processes. In a particular embodiment, a review process may have an expiration or a deadline, or may involve multiple participating reviewers posting multiple comments. Accordingly, such status information may include the number of comments posted by reviewers for a review process, the time such comments were posted, the number of reviewers, the number of times the review process has been viewed, or a remaining time before a deadline, the time at which the review process is set to expire. A user may select a review process from the list or arrangement of review processes 120 by using a mouse, or other pointing or selecting device, to click on a particular review process, for example. Subsequently, review panel 115 may provide an option to view a larger-sized rendition of thumbnail image 122 so that a reviewer may view details of visual content, for example. Such a larger-sized rendition may be rendered by a host application, such as Adobe Systems' Photoshop® graphics editing program, to be displayed on a canvas area of window 104 shown in FIG. 2, for example. However, it should be noted that one of the benefits provided by an embodiment of a workflow review process as described is that a variety of host applications or graphics editing programs may be used, and claimed subject matter is not limited to a particular application or program. While viewing visual content, a reviewer may post a comment or edit or modify the displayed visual content. The reviewer may manage his or her review by using review panel 115, which may provide options to communicate his or her comments or edited or modified visual content to a workflow management server so the comments, edits, or modifications may be viewed by other users. In addition to providing management functions for a review process, review panel 115 may display details or statistics regarding a selected review process, which will be discussed in further detail below with reference to an embodiment shown in FIG. 15. Of course, such details of a review panel are merely examples, and claimed subject matter is not so limited.

Figure 4:
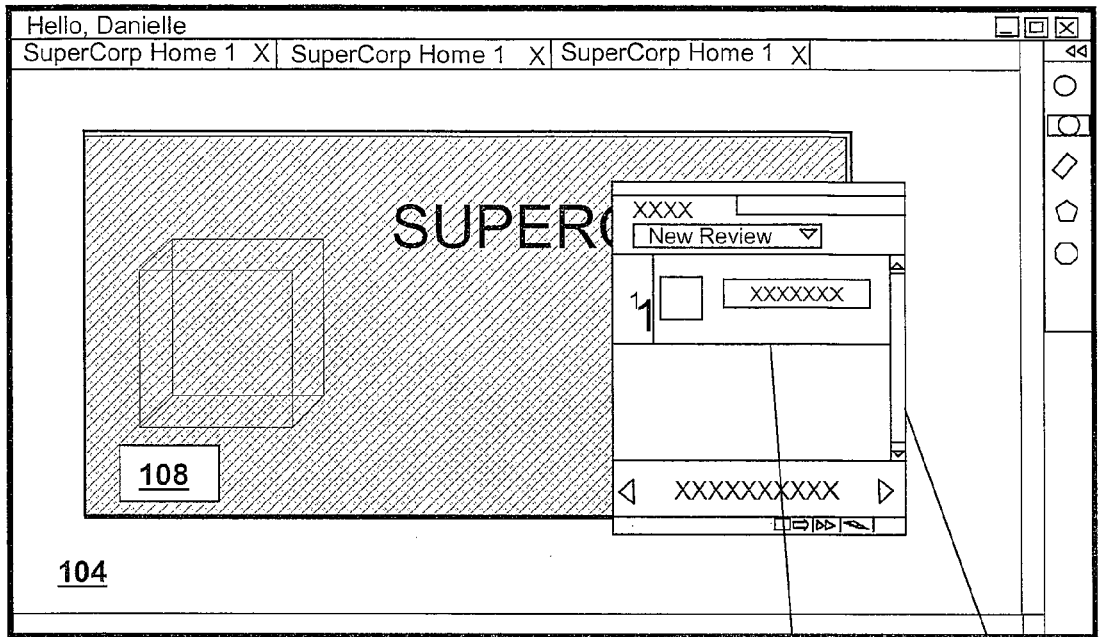
FIGS. 4 through 7 are representations of screenshot views of another user display, according to an embodiment.
Figure 5:
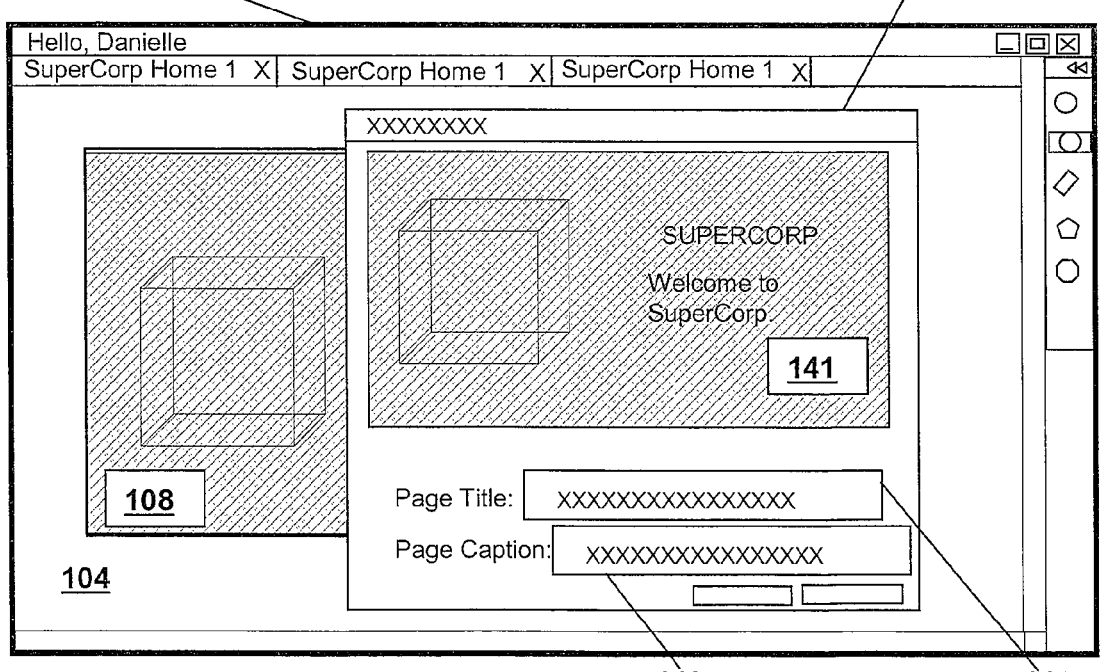

FIGS. 4 through 7 are representations of screenshot views of one user display, according to an embodiment. Such figures may show an example progression of an editor managing a project in a review process, though claimed subject matter is not limited to such an example progression, of course. As shown in FIG. 4, display 100 may comprise visual content 108 in application window 104. Displayed in a foreground of such visual content may be an embodiment of review panel 115 resulting from a selection of a new review in pull-down menu 130 shown in FIG. 3, for example. Accordingly, review process listing 134 may prompt a user, which may be an editor, to select at least a portion of visual content 108 for a review process. Such a selection, for example, may be carried out by clicking and dragging a screen icon using a mouse or other pointing or selecting device. As a result, and shown in FIG. 5, a new window 140 may appear in display 100 that shows selected visual content 141. Window 140 may also prompt a user for a title 142 or caption 143 to be associated with selected visual content 141. Additional new review processes may be created by repeating the process above. Such a new review process may have a new name or identification and be represented in review process listing 134, for example.

Figure 6:
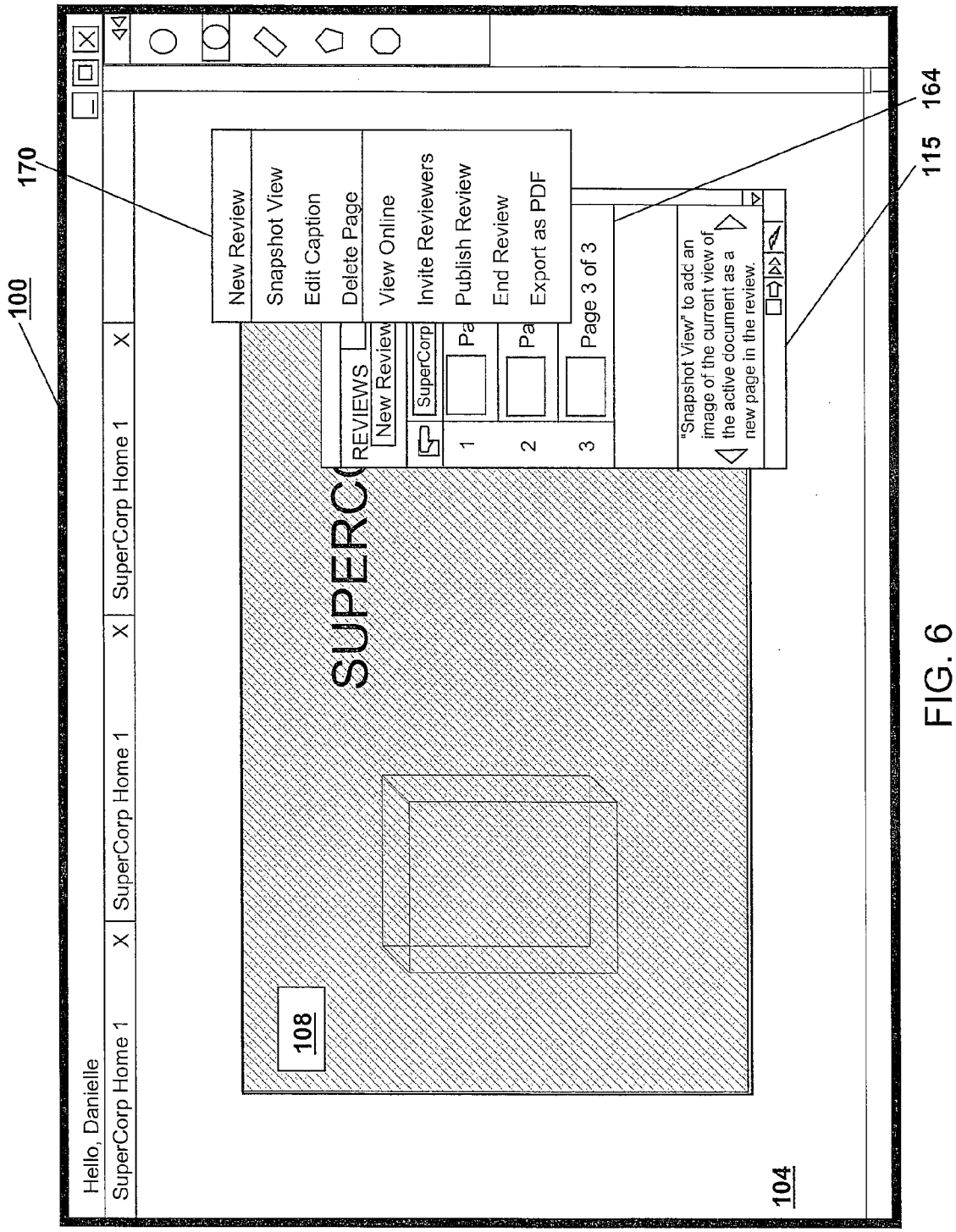
Figure 7:
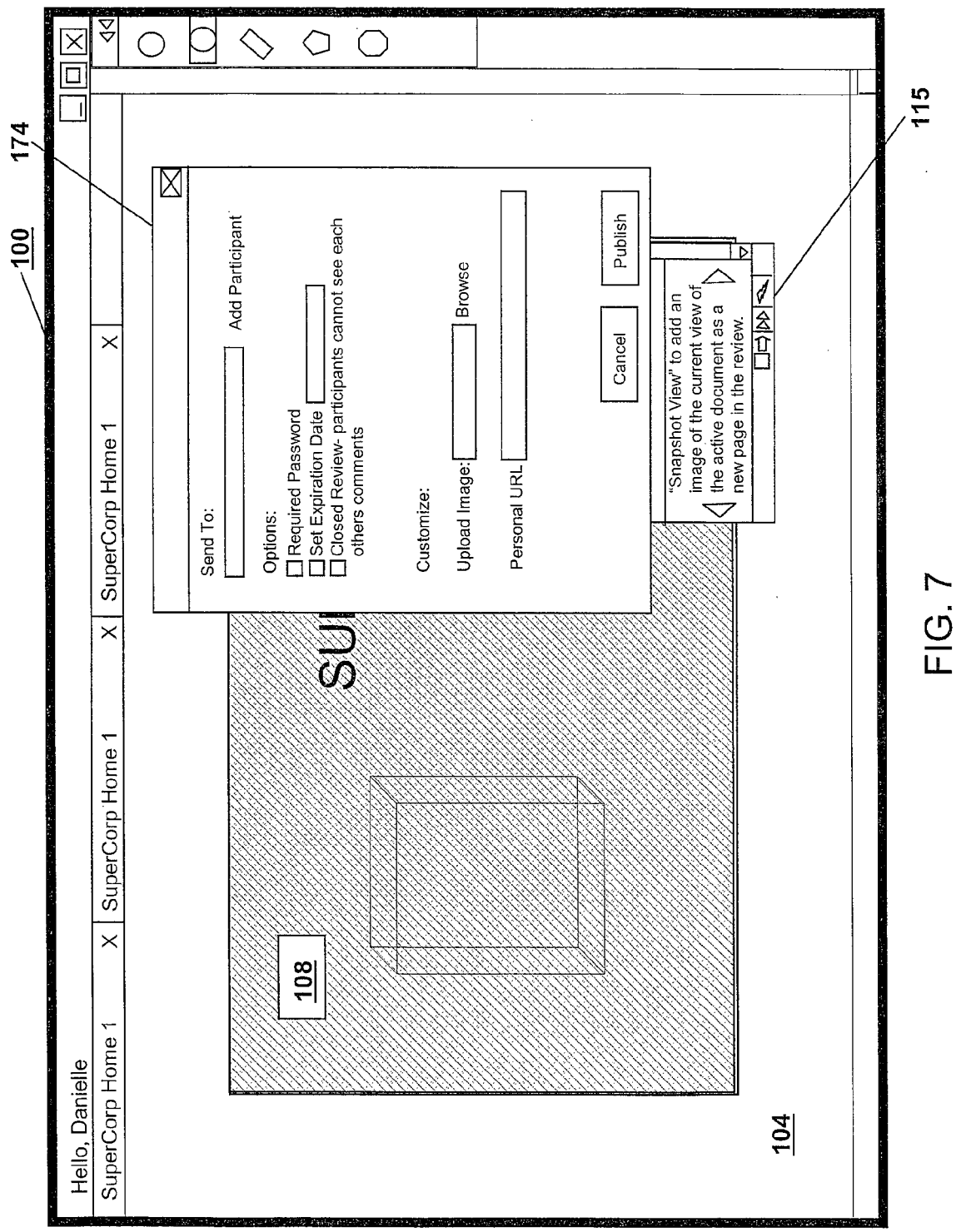

As shown in FIG. 6, display 100 may comprise visual content 108 in application window 104. In the foreground, such visual content may comprise an embodiment of review panel 115 including an arrangement 164, for example, of a review process that includes three pages of renditions of a project created by an editor, for example. Also shown, and which may be a result of a user action, a pop-up menu 170 may prompt an editor to select an operation, including an operation to create a new review process, edit or delete pages of renditions of a project in a review process, end a review process, or publish a review process, just to name a few examples. If an editor selects an option to publish a review process, for example, a pop-up window 174 may appear, as shown in FIG. 7. Pop-up window 174 may prompt an editor for information to be used by a workflow management server on a network to message one or more reviewers, for example. Such information may comprise reviewers' names, reviewer's electronic addresses, such as email addresses or cellular numbers, or names of one or more reviewer groups and their associated addresses, just to name a few examples. Pop-up window 174 may also prompt an editor for a password selection, an expiration date for a review process, or whether participants in a review process may be able to view one another's comments, for example. An editor may also add customized information, such as an iconic image or a web address, among other possibilities. Upon completion, such entered information may be communicated to a workflow management server on a network, which may then transmit a message to one or more client devices respectively associated with participants in the review process. For example, a reviewer selected by an editor may receive an email that informs the reviewer that visual content is ready for review. Such an email may also include an electronic file of the visual content as an attachment or an address, such as a URL address, where such visual content may be obtained. For example, such visual content may be stored on a workflow management server on a network and may be accessible via a LAN, a WAN, or via the Internet. Of course, such details of a review process are merely examples, and claimed subject matter is not so limited.

Figure 8:
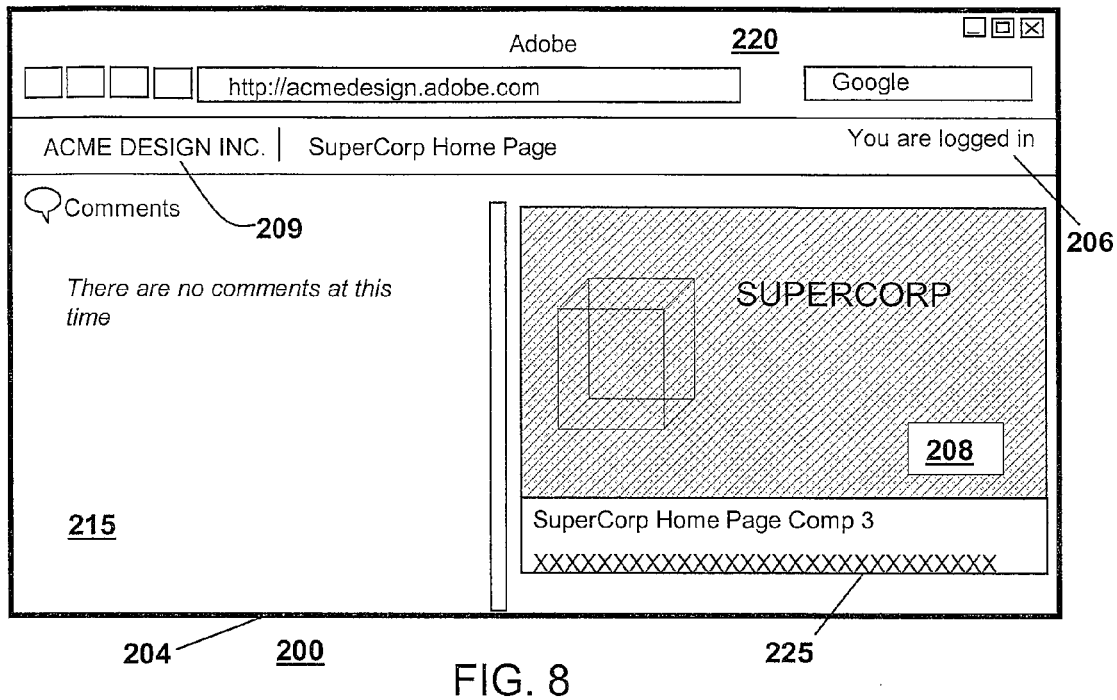
FIGS. 8 through 13 are representations of screenshot views of still another user display, according to an embodiment.

FIG. 8 is a representation of a screenshot view of a user display 200, according to an embodiment. Such a display and its associated GUI may be operated by a special purpose client device, such as a thin client or other computing device, which may communicate with other displays via an electronic network, such as a LAN, WAN, or the Internet, for example. Display 200 may comprise a window toolbar 220 that includes indicator 206 to display log-in status regarding a signal or communication connection to a workflow management server or host, as previously suggested. Display 200 may also include branding field 209, which may comprise a description, logo, icon, or a combination of such elements. For example, branding field 209 may comprise a logo that represents the particular entity engaged to create a set of visual content for a particular client. Display 200 may provide an application or platform environment 204 for working with visual content 208 and a comment panel 215 for participating in a review process for such visual content. For example, such an application or platform environment may allow a user to edit, manipulate, process, or create slides, text, photos, video, audio, marketing materials, brochures, or any other combination of content capable of being created electronically.

Display 200 is versatile enough that it may provide the user with that user's desired application or platform environment for working with visual content, such as one preferred by a particular reviewer, which need not comprise the same application or platform of another user. Accordingly, participants in a review process may have the benefit of being able to work with an application or platform of their choice, regardless of what application or platform was used to create or to subsequently modify the visual content, for example. Application or platform environment 204 may include a canvas area for displaying visual content 208 and a comment panel 215 for posting or viewing one or more comments during a review process, for example. Such a canvas area may comprise a portion of a display that may be used to create, view, or edit content, such as visual content, while working with a graphics program or application, such as one executing Adobe Systems' Photoshop® graphics software, for example. In an embodiment, a review panel, such as review panel 115 for example, may be referred to as a comment panel if such a review panel is displayed on a display of a reviewer. Such a comment panel may include features of a review panel, as described herein, but may provide a visual experience that is suited to a reviewer, wherein a review panel may be more suited to an editor or project manager, though claimed subject matter is not so limited. For example, comment panel 215 may comprise a default display that lists comments, whereas a review panel may comprise a default display that lists review processes, such as pending or completed review processes. Again, such details are merely examples, and claimed subject matter is not so limited. Comment panel 215 may be displayed in a foreground of visual content 208 or arranged along an edge or other portion of application or platform environment 204 as shown in FIG. 8. Comment panel 215 may be moved within display 200 by a user as well, of course. Display 200 may also include a page caption panel 225 comprising, for example, a caption or title regarding visual content 208, for example. As indicated previously in an example, visual content 208 may comprise a JPEG image displayed by a platform or application, though visual content is not limited to such a format or to only image content. Of course, such details of a display or a comment panel are merely examples, and claimed subject matter is not so limited.

As discussed above, comment panel 215 may be displayed on a special purpose client device to display dynamic or user-selectable content for commenting during a review process. For example, comment panel 215 may display elements that are user-selectable for a variety of commenting operations, which will be explained in greater detail below. In a particular embodiment, comment panel 215 may be generated using, at least in part, a special purpose multimedia computer platform used by a special purpose client device, or an application such as Adobe Systems' Flash® platform, for example. However, comment panel 215 may provide a similar user experience, e.g., look and feel, for a variety of varying platforms that may be used to generate the comment panel. Accordingly, multiple users, despite working on different platforms with different applications, may view a sufficiently standardized comment panel layer that displays or provides access to information that may be substantially the same, or at least employs standardized features, across multiple users.

In one embodiment, an application operating for a special purpose client device may be modified in order to facilitate generation of comment panel 215. For example, but not to be limiting, such a modification may include adding code, script, or subroutine(s), for example, to allow generation of comment panel 215. Accordingly, such a modified application may process received information regarding one or more review processes to populate comment panel 215 with dynamic or user-selectable content or to be updated continually or from time to time. Such information may be received from a workflow management server that may store and reference such information via a user-ID associated with a special purpose client device, for example. Of course, such a relation between a special purpose client device and a special purpose network server is merely an example, and claimed subject matter is not so limited.

Figure 9:
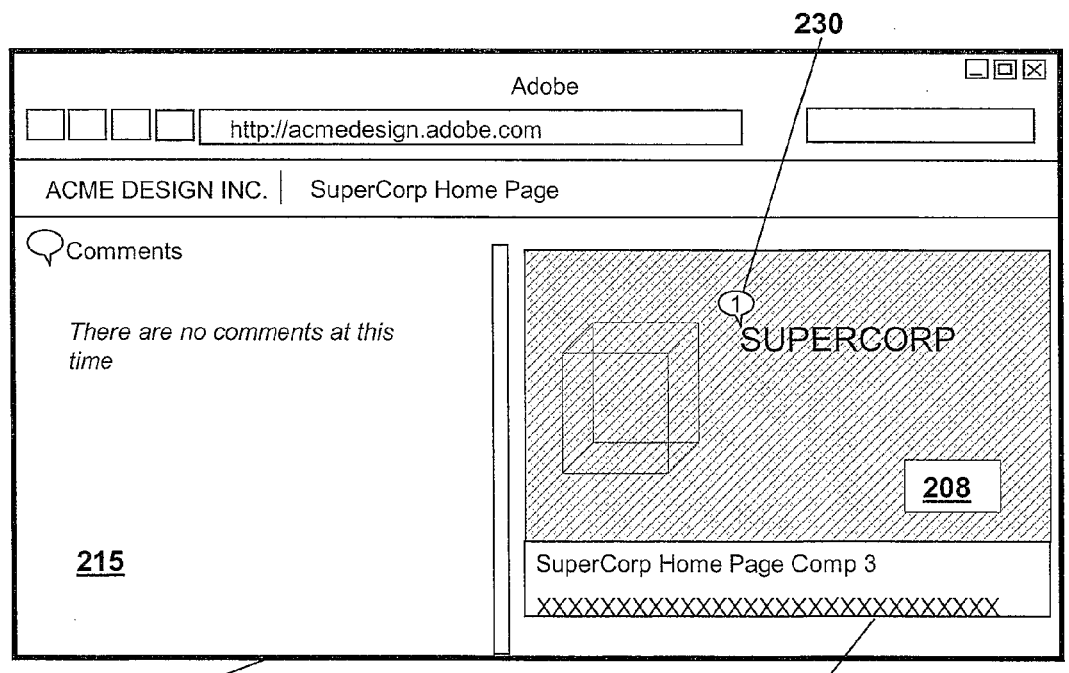

FIG. 9 is a representation of a screenshot view of a user display 200, according to an embodiment. A process of making a comment regarding visual content may be sufficiently simplified so that a reviewer may merely select a portion of the visual content to initiate a comment-posting process, at least in one particular embodiment. Thus, in this embodiment, for example, an indication is received that a review process is to be initiated based at least in part on such identification or selection of content. For example, if a reviewer wishes to make a comment regarding a particular portion of visual content 208, the reviewer may select the particular portion, for example, by clicking on the particular portion of visual content 208 of course again using a mouse or any pointing device, for example, to create a comment point 230. Claimed subject matter is not limited to the use of a mouse. For example, a touch screen may be used, wherein "clicking" may be replaced by "touching." A process of selecting a portion of visual content may be called content selection. Content selection need not be limited to selecting a portion of visual content centered about comment point 230. For example, using any pointing device, an area of visual content may be selected wherein comment point 230 may be used as a starting point for area selection process (e.g., click on comment point 230 and drag to select an area).

Figure 10:
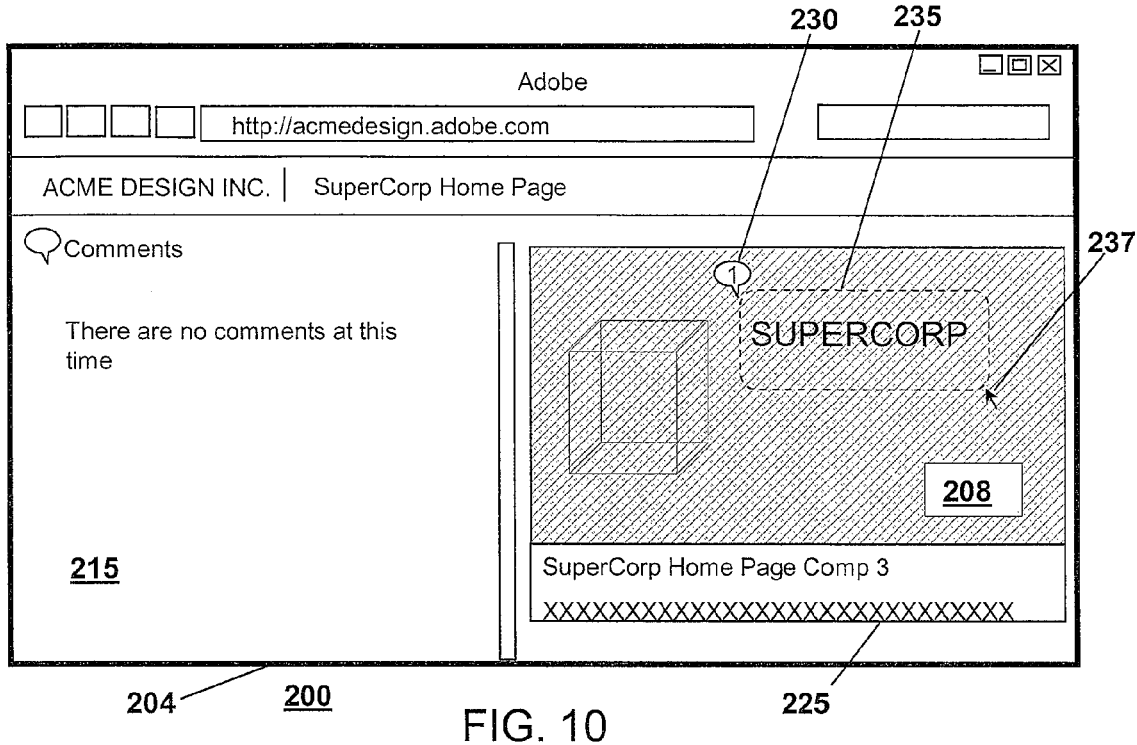
Figure 11:
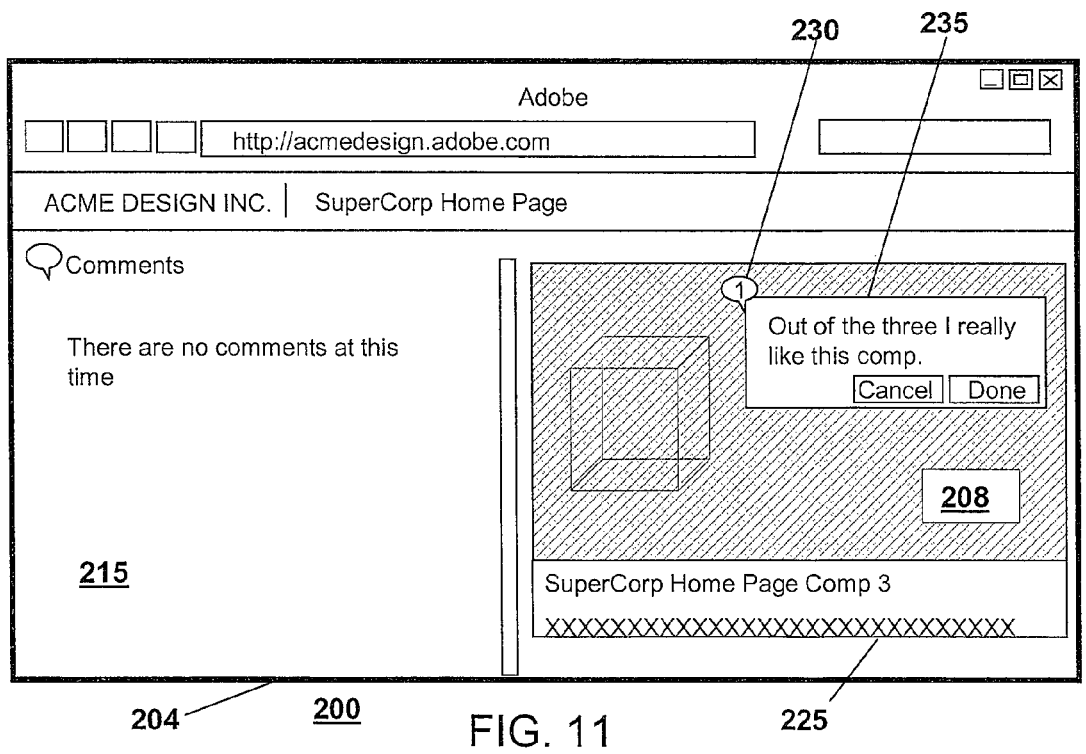
Figure 12:
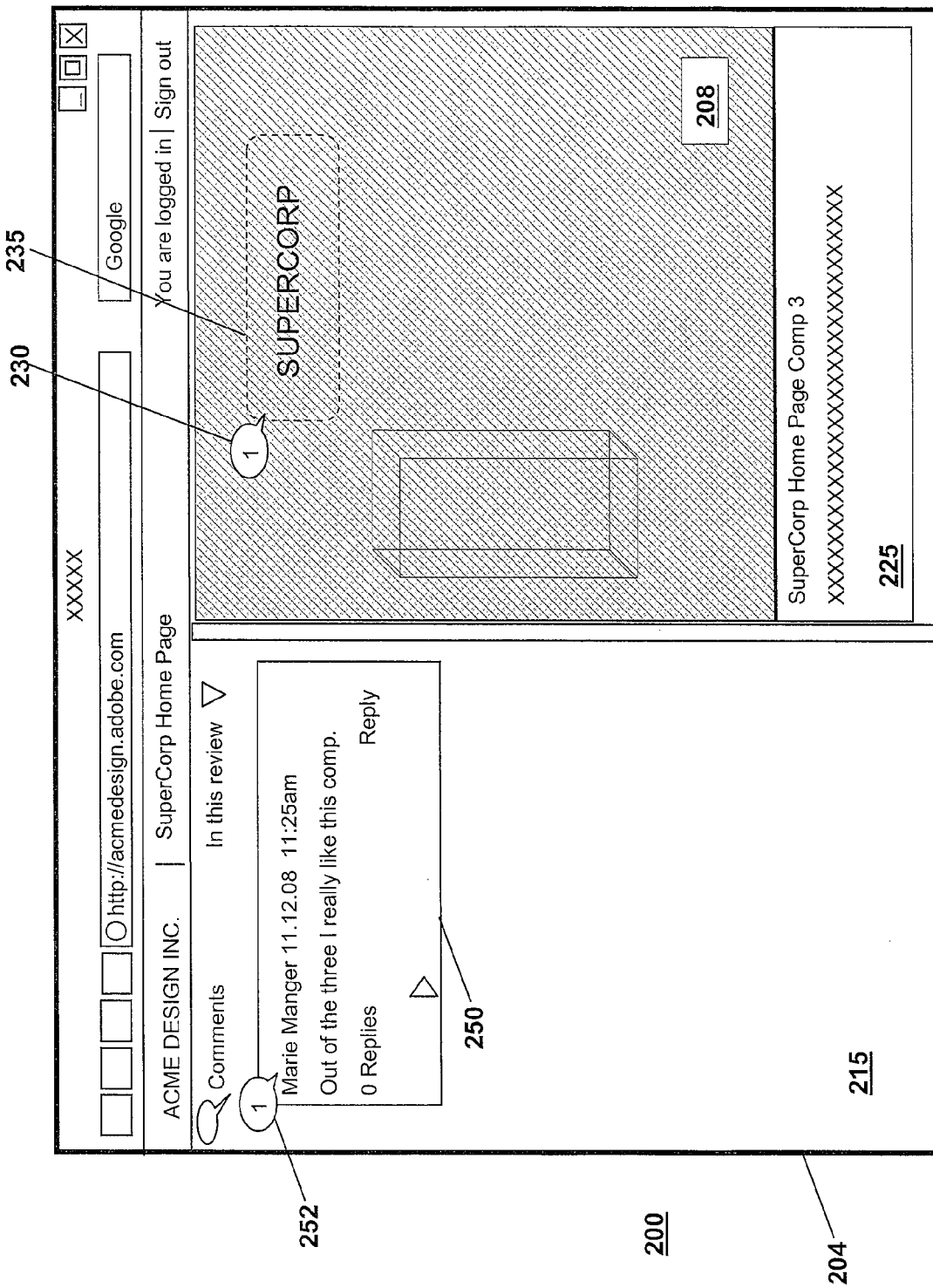

Subsequently, the reviewer may click and drag pointing device 237 to create a bounding box 235, shown in FIG. 10, to enter a comment. As shown in FIG. 11, a reviewer may type a comment inside bounding box 235. Upon or after completion of typing a comment in bounding box 235, the comment may be communicated to a special purpose workflow management server on a network, along with a selected portion of visual content 208, where the comment and its associated selected portion may be stored or distributed to one or more reviewers or an editor participating in an associated review process, for example. Accordingly, the comment may be downloaded to a reviewer's client device to appear as a comment entry 250 listed in comment panel 215, as shown in FIG. 12. In one implementation, comments with edited, selected visual content may be exchanged among reviewers in a real-time process. Meanwhile, in a particular embodiment, comment point 230 and an outline of bounding box 235 may remain displayed in a foreground of visual content 208.

Comment entry 250 may include a comment, the name or identification of the reviewer who made the comment, the day and time that the comment was made, and a color-coded icon 252 that corresponds to comment point 230, which may provide a unique number or identification to the comment, for example. In one implementation, comment point 230 may be color-coded according to the particular reviewer who is posting the comment. Such color-coding will be explained in further detail below. A selected portion of visual content associated with a comment may in one embodiment comprise an area of visual content substantially centered at a comment point 230 selected by a reviewer, for example. In one embodiment, such a selected portion may comprise an area that varies with size, location, or other attributes of an object among visual content selected by a reviewer or an area that includes a particular size, such as one-hundred by one-hundred pixels, just to illustrate a particular example, though claimed subject matter is not so limited. A portion of visual content associated with a comment may in one embodiment comprise a sequence of video frames, for example, including one or more video frames selected by a reviewer. For example, in one implementation, the number of video frames in a video clip may vary according to a reviewer selection. A reviewer, for example, may select a particular portion or frame of video content, and subsequently implicitly or expressly through an input device select a length or range of time of video content to include in a selected video clip, although claimed subject matter is not so limited. In another example, a reviewer may implicitly or expressly through an input device select a begin time or video frame and an end time or video frame to define a video clip, although, again, claimed subject matter is not so limited. By associating such a selected portion of visual content with an individual comment, a reviewer or editor may ascertain to which portion of visual content the comment refers.

As suggested, in an embodiment, particular colors among a palette of colors may be assigned by the particular platform to one or more users. In other words, individual participants, such as reviewers or editors, may be assigned a unique color without direction or instruction. A workflow management server, for example, may select colors for participants based at least in part on a notion of providing highly contrasting colors to different participants to ease identification of individual reviewers or editors. Such color contrast may be based, at least in part, on a selected palette or on color computation. For example, without limitation, a first reviewer may be assigned the color red, a second reviewer may be assigned the color yellow, a third reviewer may be assigned the color green, and so on. Such an assigned color may be applied to participants' comments or associated icons, such as comment entry 250 or color-code icon 256, for example. In one implementation, such an assignment of colors to particular reviewers may be maintained throughout a review process, though in other implementations ways to update such an assignment may also be included. For example, a user may request a color assignment change, or a reassignment of colors may occur without specific user instructions or intervention if one or more participants drop out of a review process, just to mention a few examples. During or after such a color assignment change, review panels, applications, or platforms of the participants of a review process may then be updated to reflect the color assignment change. Of course, such a description of color assignment and color management is merely an example, and claimed subject matter is not so limited.

Referring to FIG. 12, a reviewer may choose to edit or modify visual content 208 or a selected portion of visual content 208 by using an application of his or her choice, independent of the particular application used to create or previously modify the visual content, as suggested previously. For example, a host application, such as Adobe Systems' Photoshop® graphics editing program, may be used to display visual content 208 on a canvas area of window 204, where edits or modifications may be made, for example. However, it should be noted that one of the benefits provided by an embodiment of a workflow review process as described is that a variety of host applications or graphics editing programs may be used, and claimed subject matter is not limited to a particular application or program. While viewing visual content, a reviewer may post a comment or edit or modify the displayed visual content. The reviewer may manage his or her review by using comment panel 215, which may provide options to communicate his or her comments or edited or modified visual content to a workflow management server so the comments, edits, or modifications may be viewed by other users. Though visual content may be modified during a review process, the original visual content may likewise remain unmodified in a separate portion of memory. However, in a particular embodiment, individual modified versions of visual content, e.g., visual content modified at various stages of a review process, may also be maintained in other locations in a memory.

Figure 14:
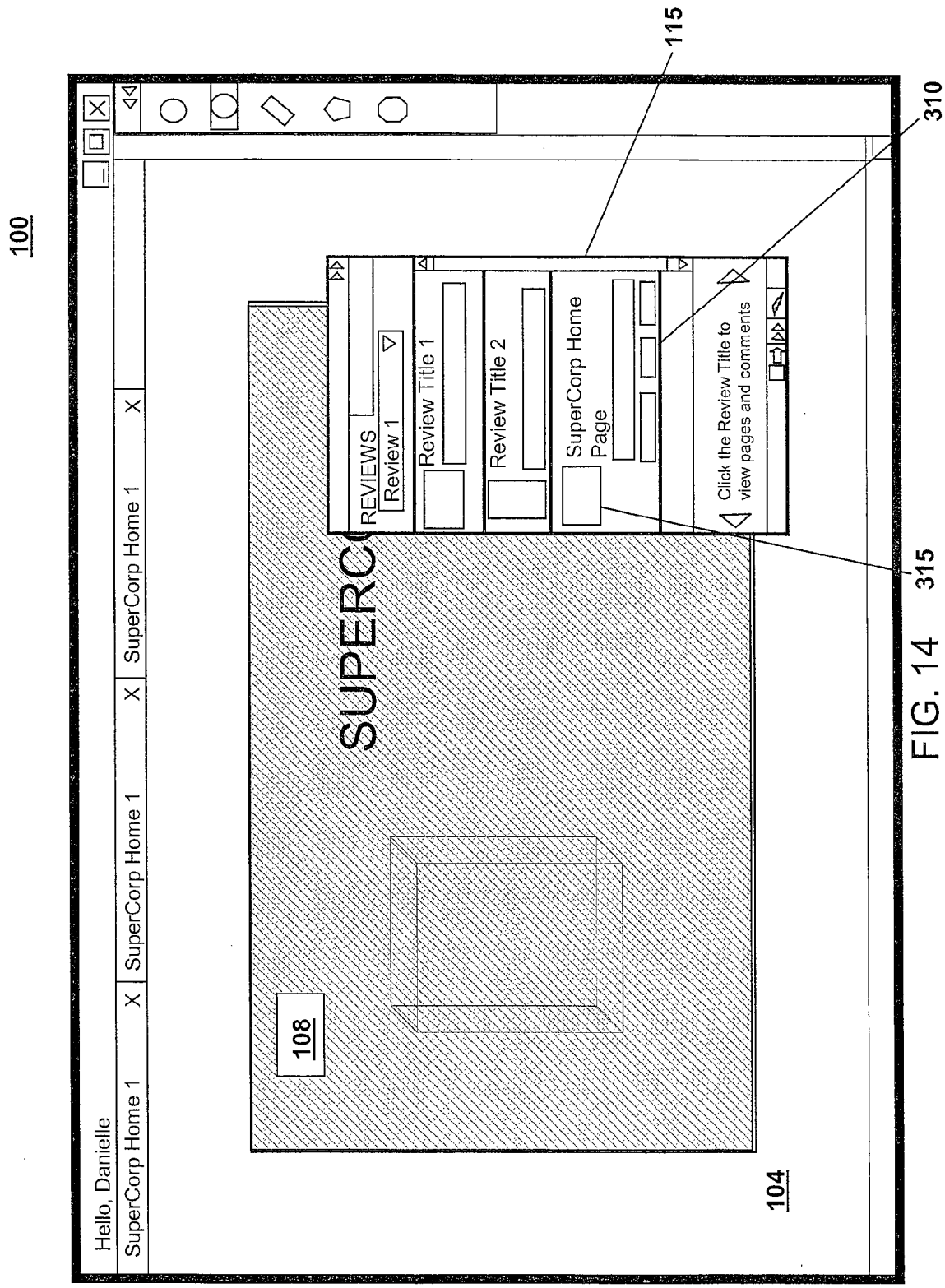
FIGS. 14 and 15 are representations of screenshot views of yet another user display, according to an embodiment.
Figure 15:
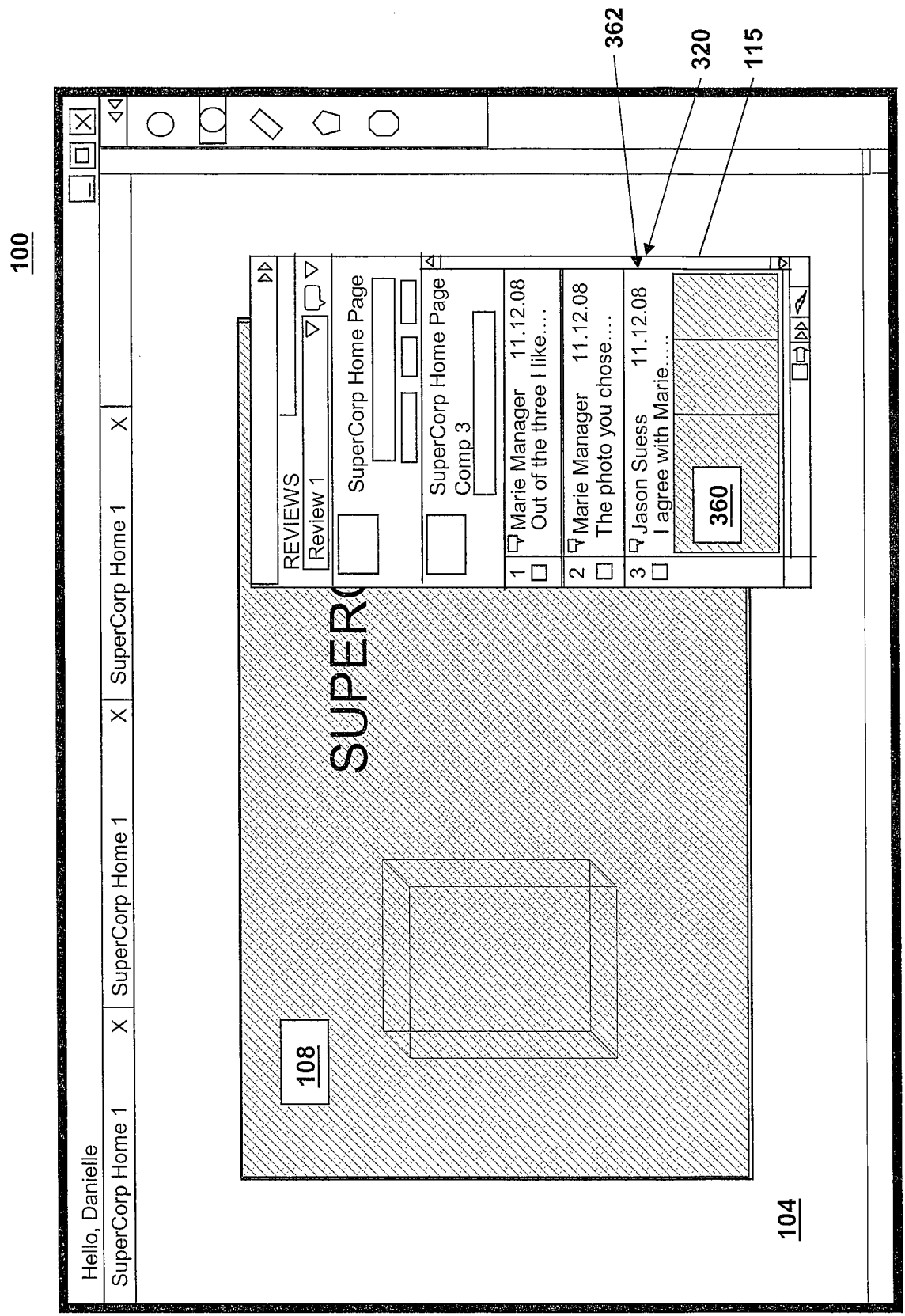

In FIG. 14, a review panel 115 displayed in a foreground of an editor display 100 may reflect review process information downloaded from a special purpose workflow management server on a network continually or from time to time. In other words, as one or more reviewers comment on visual content, such comments or associated selected portions may be posted in review panel 115. In one embodiment, such postings may be in real-time. Accordingly, such a special purpose workflow management server may facilitate convenient collaboration among participants by keeping participants apprised of comments or visual content changes as they occur, for example. To continue an example presented in FIG. 3, review panel 115 may display information in the list or arrangement of review processes 120 comprising the number of comments in a particular review process, the number of participating reviewers, or the number of reviewers currently active, just to name a few examples. Upon or after selection, a review process listing in review panel 115 may be expanded to show all or a portion of comments made in the review process, along with selected portions of visual content associated with the comments, as shown in FIG. 15.

Figure 13:
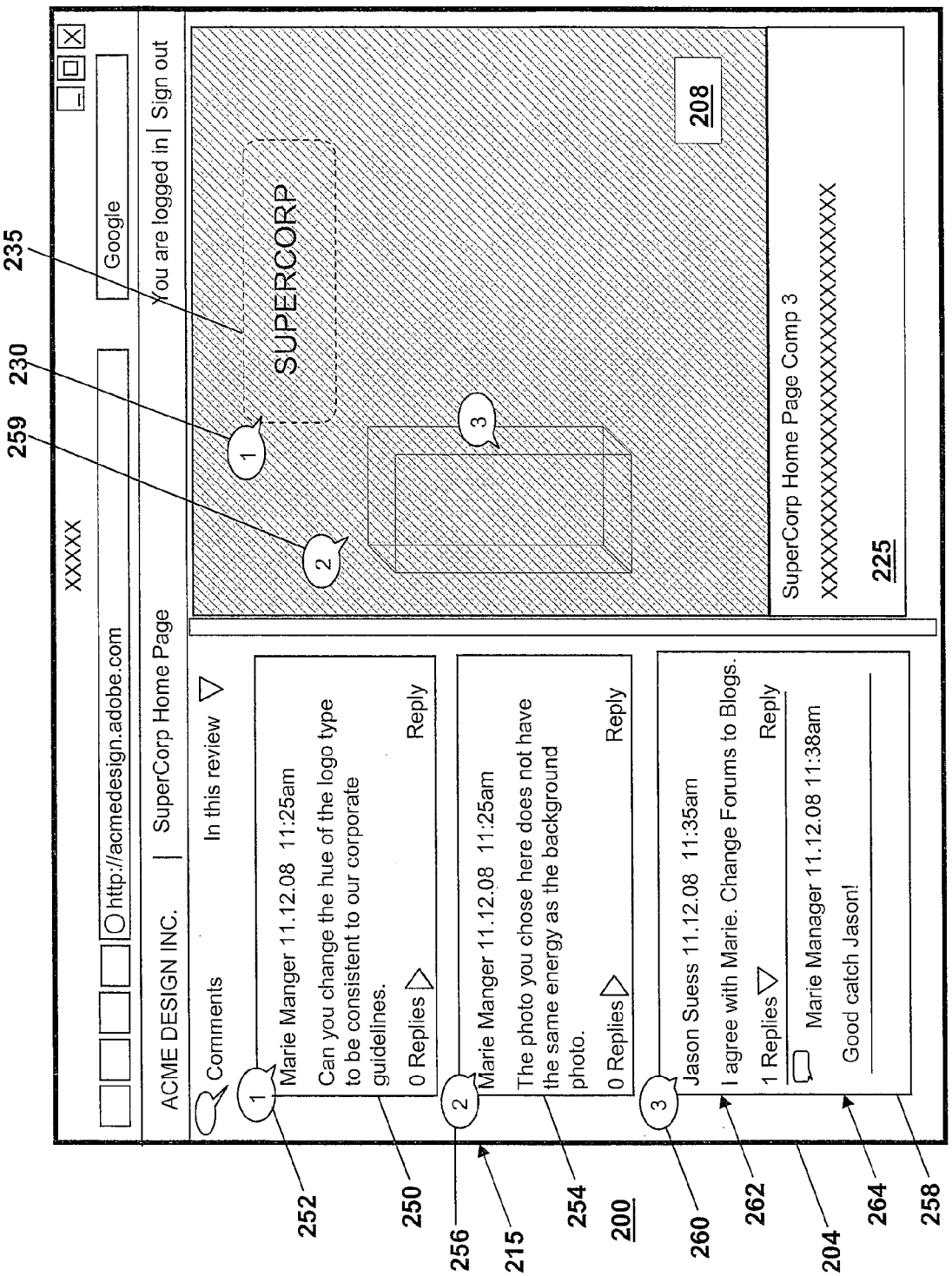

In an embodiment, shown in FIG. 13, a reviewer that made a comment, such as associated with comment entry 250, may make an additional comment by again clicking on a portion of visual content 208 to create another comment point 259. Also, the reviewer may again edit or modify visual content 208, as previously described. The comment associated with comment point 259 may be listed in comment entry 254, which may include color-coded icon 256, the additional comment, and so on. Yet another comment entry 258 may include another comment 262, this time by another reviewer, for example. Because another reviewer made the comment of comment entry 258, an associated color-coded icon 260 may comprise a different color than that of comment entries 250 and 254, for example. In a particular embodiment, comment entry 258 may provide an opportunity for another reviewer to reply to comment 262 of comment entry 258, thereby posting an additional comment 264 listed in comment entry 258 as a result.

As explained above, as reviewers make comments during a review process, such comments may be communicated to a workflow management server on a network, where such information may be maintained or accessible to one or more users, e.g., reviewers or an editor. Also, individual comments may be associated with a selected portion of visual content to which the comment pertains, and such an association or selected portion may also be maintained or be accessible to one or more reviewers or an editor.

Comments may be presented in a comment arrangement 320, wherein an editor may rearrange, delete, or tag comments, just to name a few examples of comment-management operations. For example, the list of comments 320 may be organized or rearranged by a user using a mouse to click and drag, or other selecting device for example, individual comments above or below one another. In another particular implementation, a user may select to use a workflow management server to organize or rearrange the list of comments chronologically, alphabetically, by reviewer, by deadline, or by importance, just to name a few examples. Individual comments may be selected to display their associated content selection. For example, comment 362 may be selected to display associated content selection 360, which may, in the case of a snapshot, comprise a portion of visual content substantially centered at a point where a reviewer selected to make comment 362. In the case of a video clip associated with a comment, content selection 360 may comprise a video player including playback controls (not shown) such as play, pause, or stop to view the video clip posted by the commenter, for example. Such management operations may also be available to other users, not just editors or reviewers, for example. Of course, such details of a review panel are merely examples, and claimed subject matter is not so limited.

In one embodiment, a user may select content selection 360 from review panel 115 to edit or modify the associated visual content 108. Edited or modified visual content may be electronically posted onto a workflow management server by selecting a command to do so from the review panel 115, for example. Other reviewers may subsequently view edited or modified visual content as it is presented in their review panel 115. Such editing or modifying is not limited to a particular platform or application, but may be performed using any platform or application that is available on a special purpose client device or preferred by a user. Accordingly, participants of a review process using review panel 115 may be provided with a convenient way of collaborating with one another while working on a platform or application of their choice.

In one particular embodiment, as mentioned earlier, portions or elements of selected portions of visual content associated with comments may be selectively omitted upon being displayed in review panel 115 in order to avoid a cluttered or confusing display. For example, a presence of multiple comment points in a selected portion of visual content may lead to some comment points positioned at least partially over other comment points, resulting in a confusing display, as described earlier. Accordingly, some overlapping comment points may be selectively omitted in a selective modification process. Of course, such a process of displaying less than the complete visual content is merely an example, and claimed subject matter is not so limited.

Figure 16:
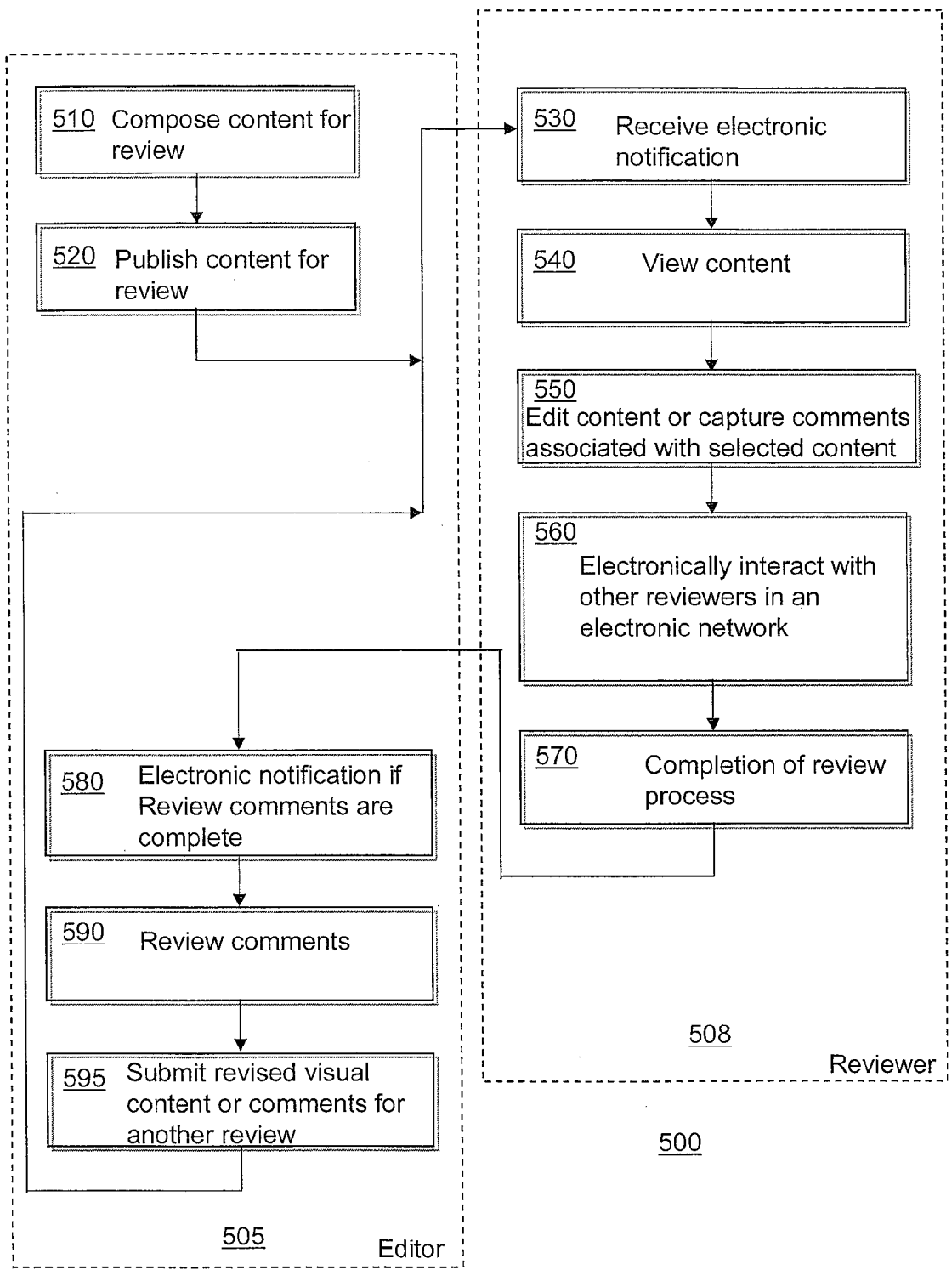
FIG. 16 is a flow diagram of a workflow review process, according to an embodiment.

FIG. 16 is a flow diagram of a workflow review process 500, according to an embodiment. Such a process may involve an editor 505 or a reviewer 508 participating in a review process for visual content, for example. Such visual content may comprise one or more images or at least a portion of video content, such as a video clip. For example, a collection of one or more video files may comprise a video clip, although not necessarily. In a particular embodiment, process 500 may involve more than one reviewer or editor. However, alternatively, there may be multiple reviewers or one editor, just to illustrate various non-limiting examples.

Activities of an editor may include composing visual content for review, as shown at block 510. Such an editor may review visual content, observe or manage one or more reviewers' comments, or resubmit visual content for further review, just to name a few example activities. A reviewer's activities may include reviewing visual content or generating comments, which may be captured electronically along with a selected portion of visual content to which the comment pertains, for example.

In one implementation, a reviewer may have an option to view such a selected portion of visual content with obstructive visual material removed. For example, comment points, edit marks, or other markings made during previous reviews may obstruct visual content to which a comment pertains. Accordingly, a reviewer may choose to selectively remove such obstructive markings. Or, in an embodiment, such obstructions may be removed without any user action or instruction.

At block 520, if visual content is deemed ready to be reviewed for example, editor 505 may "publish" visual content for review. Publishing may comprise uploading visual content or associated information to a workflow management server on a network, where such content or associated information may be stored or be made accessible to one or more reviewers. For example, such a workflow management server may act as a hub for a visual content review process. Associated information may comprise an editor's notes, comments, or instructions to one or more reviewers regarding visual content, as well as attributes associated with the visual content.

At block 530, reviewer 508 may receive electronic notification that particular visual content is available to review. Such electronic notification may comprise an appearance on a display of an icon or a dialog box, for example, of a new work item or task, or an electronic document such as email, for example. Reviewer 508 may select particular visual content to review, which may include viewing the particular visual content, as shown at block 540. Visual content for review may include associated electronically captured comments from a previous editor or one or more reviewers. Such comments may include a snapshot or video clip associating the comments with a particular portion of video content, for example. As part of a review, reviewer 508 may add his or her comments to the visual content, or edit visual content, which may also be captured electronically, as shown at block 550. A snapshot or video clip associated with previous comments may also be associated with new comments, if such comments pertain to the particular portion of video content, for example. Of course, such details of comments or associated snapshots or video clips are merely examples, and claimed subject matter is not so limited.

At block 560, reviewer 508 may interact with other reviewers, perhaps in real time, such as via an electronic network, intranet, or the Internet. For example, a second reviewer, having received visual content for review over an electronic network from a workflow management server, may also receive comments or an associated snapshot or video clip from a first reviewer via the workflow management server. In one particular embodiment, the second reviewer may, subsequent to receiving the visual content, review the visual content, post additional comments, or edit the visual content and subsequently posted the edited visual content. As mentioned above, such editing may be performed by an application independent of the application used to create the visual content, or applications other reviewers may be using, and so on. Such additionally-posted comments or edited visual contents (which may also accompany additionally-posted comments) may be available to the first reviewer in real-time via the workflow management server, for example, depending at least in part on whether both reviewers are concurrently engaged in a review process for particular visual content. In such a case, a reviewer may view other reviewers' comments or associated content as the comments or associated snapshot or video clips are being electronically posted or electronically captured for the other reviewers. Such a real time process is, of course, not limited to two reviewers; any number of reviewers may be engaged in a review process. On the other hand, a reviewer may be disengaged or off-line from a real-time interaction, as described above, while other reviewer comments remain available on the workflow management server to the disengaged reviewer at his or her convenience. In such a case, a subset of other participating reviewers may be involved in real-time collaboration At block 570, after completion of a particular review, which may include electronically captured comments or modified visual content, reviewer 508 may electronically notify editor 505 that the reviewer has completed his or her review. Such notification may be posted on the workflow management server by reviewer 508 so that editor 505 may receive such notification, as shown at block 580. In an embodiment, such a notification may include an appearance on an editor's display of a review panel, such as review panel 115 in FIG. 3 for example, that may include updated reviewer information. Other reviewers, if any, may not have completed their review, so the particular review process may continue until expiration, for example.

In an embodiment, editor 505 may select a particular review process to review a collection of comments from one or more reviewers, as at block 590. In a particular embodiment, editor 505 may also add further electronic comments or edit visual content, responsive to previous reviewer comments, for example. In another particular embodiment, one or more editors, reviewers, or other users may select which particular review participants may view particular comments or edited visual content. For example, some reviewers may be allowed to view particular comments or edited visual content while other reviewers are not permitted to view such information. Subsequently, editor 505 may submit a new, revised version of visual content as a new review, as at block 595, thus repeating at least a portion of workflow review process 500, if desired. Such a new review may maintain features of the original review, such as color-code assignments or list of participants, though editor 505 may modify such features, if desired. A new review may be named descriptively, such as "Review—second pass" so that participants may easily realize that the new review is related to a particular original review, for example. Of course, such features are merely examples, and claimed subject matter is not so limited.

Figure 17:
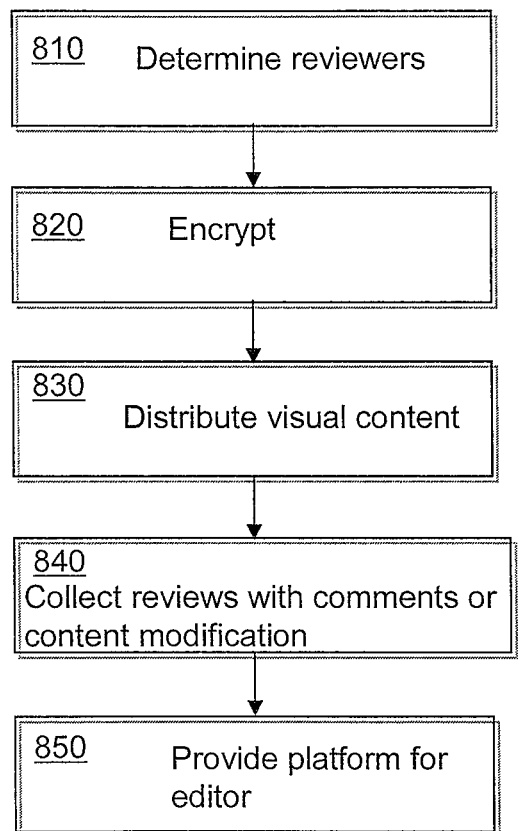
FIG. 17 is a flow diagram of a workflow review process, according to an embodiment.

FIG. 17 is a flow diagram to show particular features that may be present in a workflow review process for visual content as described above. Of course claimed subject matter is not limited in scope in this respect. Accordingly, review process 800 may comprise a portion of such a workflow review process, according to an embodiment. Starting at block 810, a process management engine, such as process management engine 701 in FIG. 1, may generate a list of reviewers for a particular review process. Such a determination may, for example, be based at least in part on past review processes, requests posted by an editor, or availability of reviewers, just to name a few examples. At block 820, visual content or associated comments to be distributed to reviewers may be encrypted for security reasons. Whether particular visual content or associated comments are encrypted may depend at least in part on a variety of potential factors, such as which reviewer is to be sent particular visual content, as one example. Such encryption may be implemented during process 800, for example, according to a selection made by an editor or a reviewer. Process management engine 701 may determine if visual content, its associated comments, or both are to be encrypted, for example. In one implementation, such encryption may be applied to any combination of visual content or associated review comments. Likewise, such encryption may be transparent to participants of a review process. Such encryption may also include digital rights management (DRM) information or user-permission information, such as access passwords, user identification, or the like.

In another implementation, a combination of visual content or associated review comments may be digitally compressed to reduce communication bandwidth issues. At block 830, visual content may be electronically distributed or broadcasted to reviewers or an editor for completion of review tasks regarding the visual content. Process 800 may also include transforming a format of visual content, for example. Such a transformation may be implemented, for example, during a workflow process.

In a particular embodiment, visual content may be transformed for compliance or compatibility with systems of particular editors or reviewers. As an example, a reviewer may be using a handheld device having a low-resolution video format, whereas another reviewer may use a workstation having a high-resolution video format. Accordingly, a process management engine may employ appropriate video formats for the particular devices used by particular editors or reviewers.

In a particular example, after full resolution visual content is uploaded or "dropped" in a system folder, a process management engine may broadcast information based, at least in part, on the full resolution visual content via multiple distribution channels. Such information may be generated by an encoding process that generates multiple visual content versions having a specific resolution and bit rate targeted for an array of delivery channels corresponding to a particular set of editors or reviewers and their device or other resource capabilities. For instance, one channel may be employed to provide high definition playback on a local area network, another channel may be employed to provide high definition playback on a high speed network, and another channel may be employed to provide a scaled-down version for cable, Digital Subscriber Line (DSL) connections or for mobile devices.

In another particular example, such generated information may be stored in multiple files, which may be accessible by a streaming media server. Accordingly, if an editor or reviewer "logs" into a process management engine, visual content may be streamed from a media server with an appropriate version of the visual content based at least in part on the particular video format or available bandwidth. In a particular embodiment, a process management engine may be capable of dynamically changing stream quality "on the fly" if network conditions change, such as a reduced bandwidth condition developing from increased high speed network traffic.

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although the claimed subject matter is not limited in scope in this respect, one embodiment may comprise one or more articles, such as a storage medium or storage media, as described above for example, that may have stored thereon instructions that if executed by a specific or special purpose system or apparatus, for example, may result in an embodiment of a method in accordance with claimed subject matter being executed, such as one of the embodiments previously described, for example. As one potential example, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, the claimed subject matter is not limited in scope to this example.

In the preceding description, various aspects of the claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes or equivalents may now occur to those skilled in the art. It is, therefore, to be understood that the appended claims are intended to cover all such modifications or changes as fall within the true spirit of claimed subject matter.

What is claimed is:

1. A method comprising:
   receiving an input selecting a portion of a graphic;
   responsive to the receiving of the input, outputting a prompt configured to receive a comment from a user that is to be associated with a portion of the graphic, the comment being a particular color assigned to the user, the assigning occurring without intervention by a user responsive to at least one participant dropping out of a review process of the graphic; and
   associating the comment with the portion of the graphic such that the portion is configured to accompany the comment for communication to a user other than the user.

2. A method as described in claim 1, wherein the input specifies one or more specific positions of the graphic.

3. A method as described in claim 2, wherein the one or more specific positions of the graphic are specified using coordinates.

4. A method as described in claim 1, wherein the graphic is part of a video and the associating is performed to reference a time code included in the video.

5. A method as described in claim 1, further comprising responsive to the receiving of the input, displaying a snapshot of the portion of the graphic.

6. A method as described in claim 5, wherein the snapshot has a reduced size in comparison to the portion.

7. A method as described in claim 1, wherein the associating includes identifying a source of the comment.

8. A method as described in claim 1, wherein the graphic includes audio content.

9. A method as described in claim 1, further comprising receiving one or more inputs to edit the portion of the content and the associating is performed for the edited portion.

10. A method as described in claim 1, further comprising displaying one or more other comments received from one or more other users via a network in real time.

11. A method comprising:
    displaying video by a computing system;
    receiving an input selecting a portion of the video;
    receiving one or more inputs involving comments with comment points on the selected portion of the video;
    omitting from display a portion of the selected portion of video, the portion of the selected portion of video being overlapping comment points, the overlapping comment points comprising at least one comment point being positioned at least in part over a comment point other than the one comment point;
    displaying multiple thumbnails corresponding to multiple portions of the video, the multiple portions of the video being associated with a same comment from among the comments; and
    associating the comments with the portion of the video using a time code of the video.

12. A method as described in claim 11, wherein the input specifies one or more specific positions of a graphic included in the video.

13. A method as described in claim 12, wherein the one or more specific positions of the graphic are specified using coordinates.

14. A method as described in claim 11, further comprising responsive to the receiving of the input, displaying a snapshot of the portion of the video.

15. A method as described in claim 11, wherein the snapshot has a reduced size as in comparison to the portion as included in the video.

16. A method as described in claim 11, wherein the associating includes identifying a source of the comment.

17. A method as described in claim 11, wherein the video includes audio content.

18. A method as described in claim 11, further comprising receiving one or more inputs to edit the portion of the content.

19. A method as described in claim 18, wherein the associating is performed for the edited portion.

20. A method as described in claim 11, further comprising displaying one or more other comments received from one or more other users via a network in real time.

21. An apparatus comprising one or more computing platforms storing program instructions on machine-readable storage memory, configured to execute the stored program instructions on one or more processors to perform operations comprising:
    responsive to the receiving of an input selecting a portion of a graphic in a user interface, outputting a prompt configured to receive a comment that is to be associated with the portion of the graphic;
    associating the comment with the portion of the graphic;
    determining to encrypt at least one of the comment or the portion of the graphic, the determining to encrypt being based at least in part on whether a particular reviewer is one of one or more reviewers;

forming a communication to communicate the comment and the portion of the graphic via a network for display to the one or more reviewers, at least one of the comment or the portion of the graphic being encrypted based on the determining to encrypt, the portion of the graphic communicated in the communication being selected from among multiple versions of the portion of the graphic to have a resolution and a bit rate targeted for the one or more reviewers; and displaying comments received from the one or more reviewers in real time in the user interface.

22. An apparatus as described in claim 21, wherein the input specifies one or more specific positions of the graphic.

23. An apparatus as described in claim 21, wherein the graphic is part of a video and the associating is performed to reference a time code included in the video.

24. An apparatus as described in claim 21, further comprising responsive to the receiving of the input, displaying a snapshot of the portion of the graphic.

25. An apparatus as described in claim 21, wherein the associating includes identifying a source of the comment.

26. An apparatus as described in claim 21, further comprising receiving one or more inputs to edit the portion of the content and the associating is performed for the edited portion.

* * * * *